Inventor
Joseph Kellogg
by Parker & Carter
Attorney

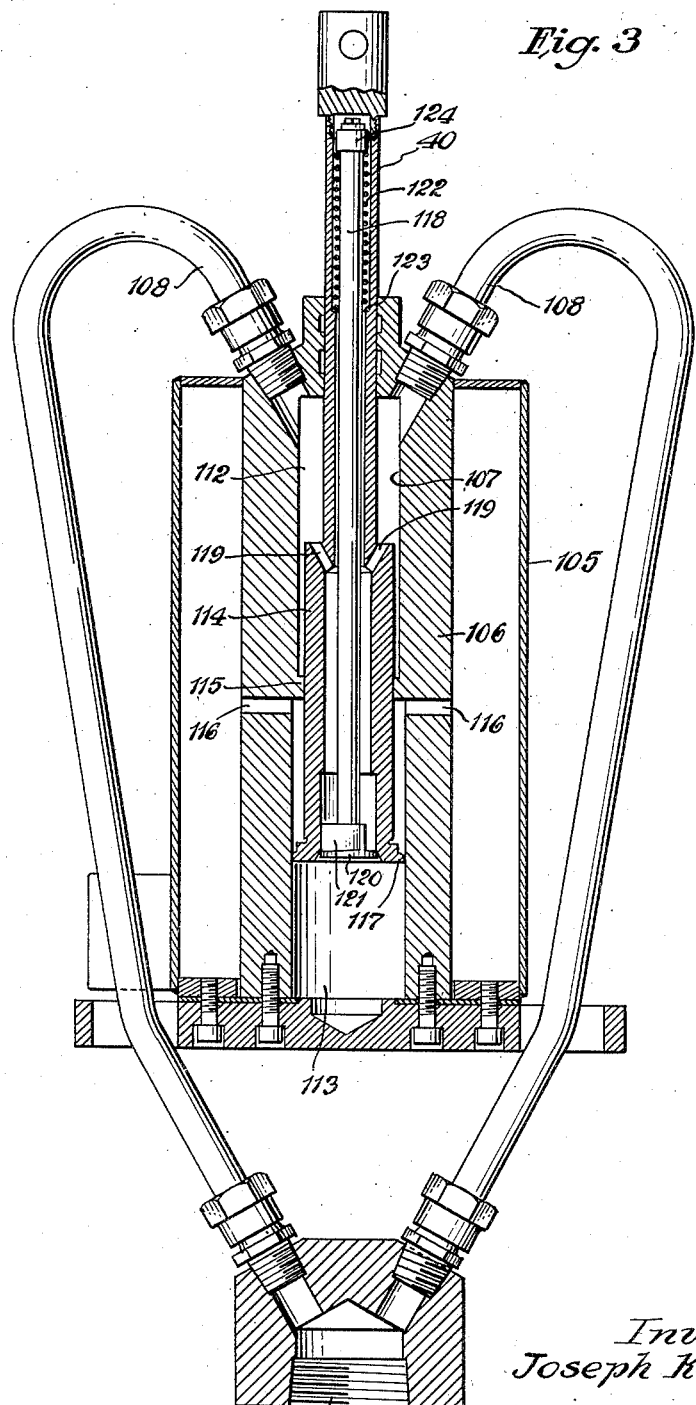

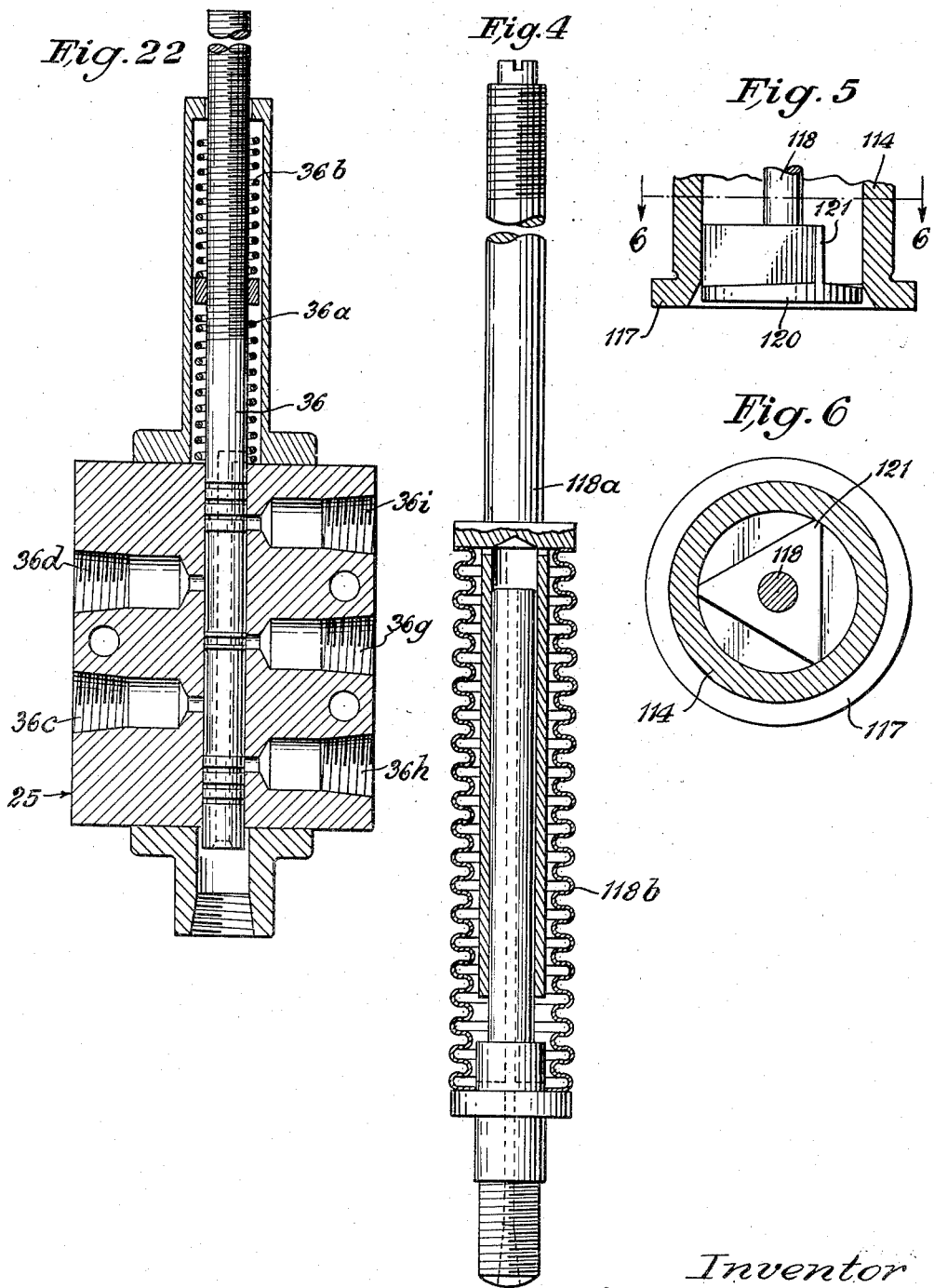

Inventor
Joseph Kellogg
by Parker & Carter
Attorneys

Feb. 18, 1958  J. KELLOGG  2,823,897
POSITIVE HOIST CONTROL
Filed Dec. 13, 1954  14 Sheets-Sheet 6

Inventor
Joseph Kellogg
by Parker & Carter
Attorneys

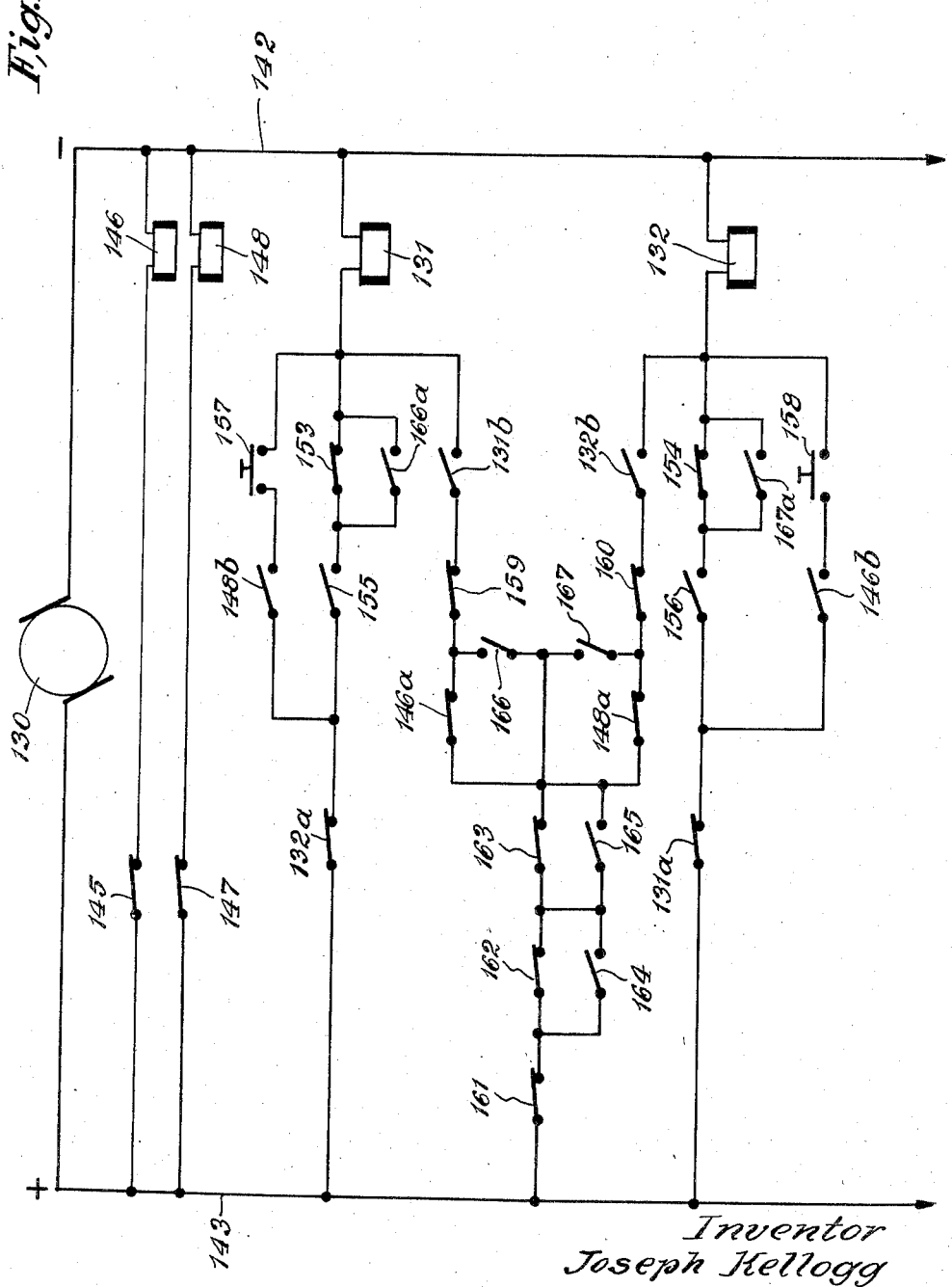

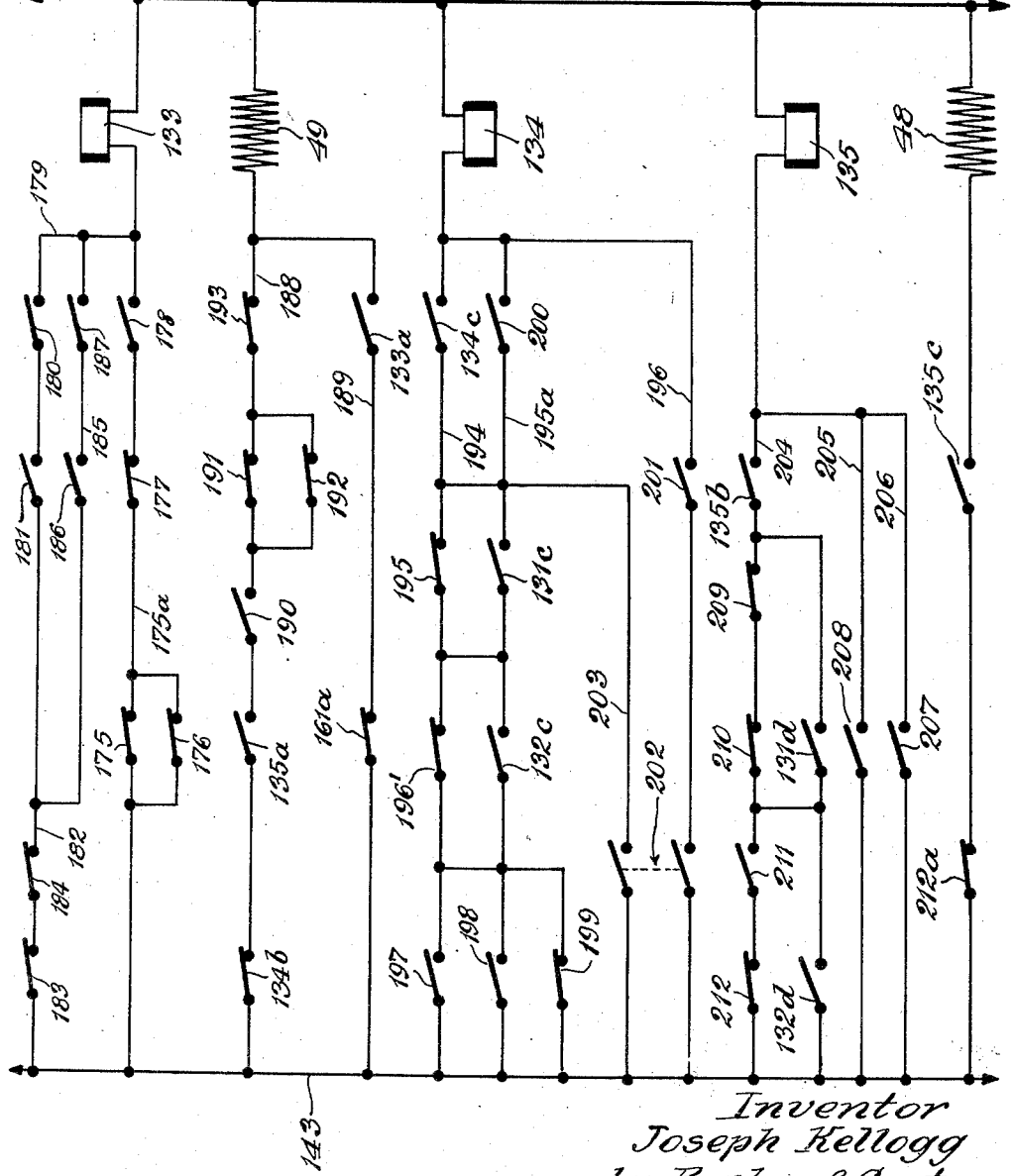

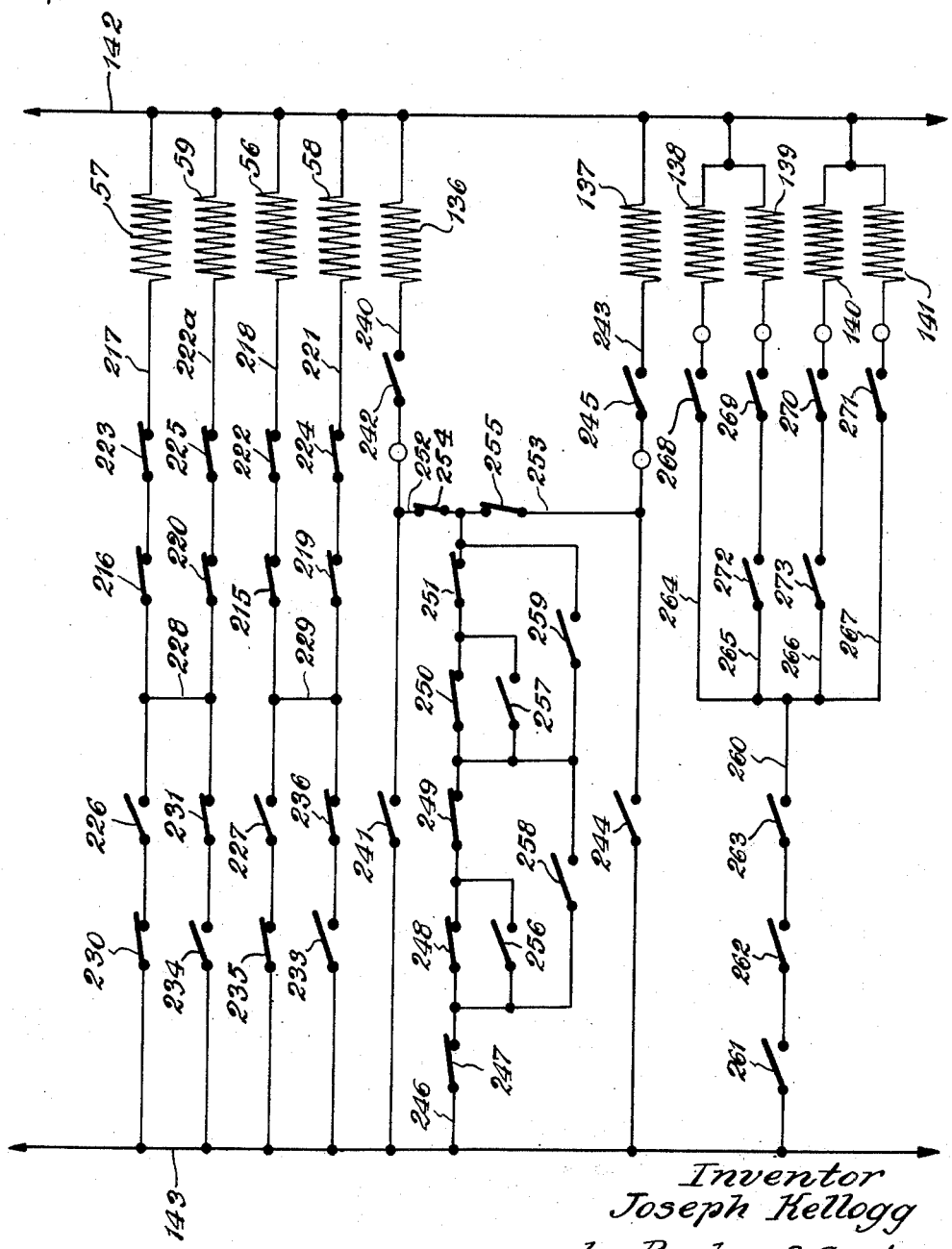

Feb. 18, 1958   J. KELLOGG   2,823,897
POSITIVE HOIST CONTROL
Filed Dec. 13, 1954   14 Sheets-Sheet 10
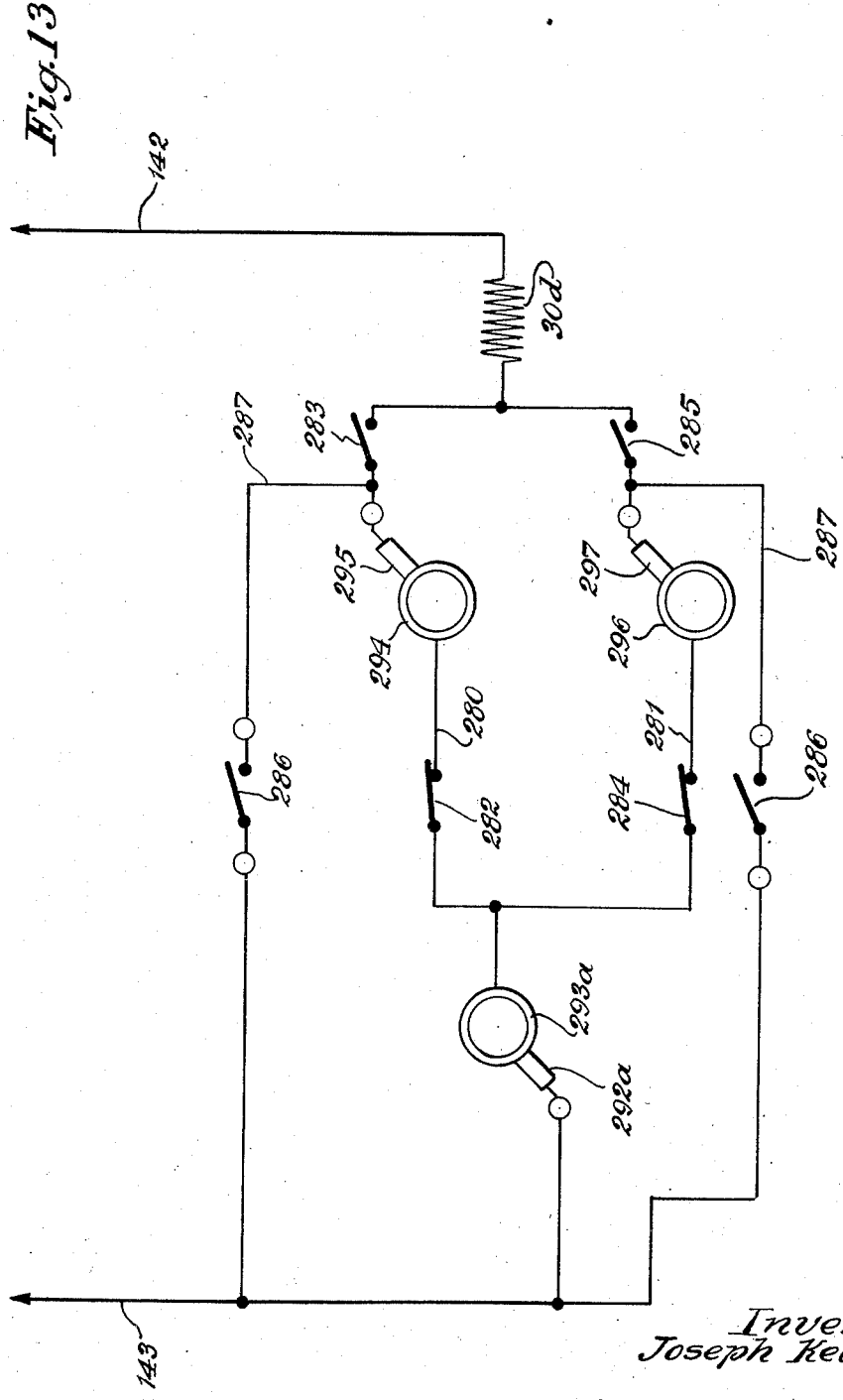
Inventor
Joseph Kellogg
by Parker & Carter
Attorneys

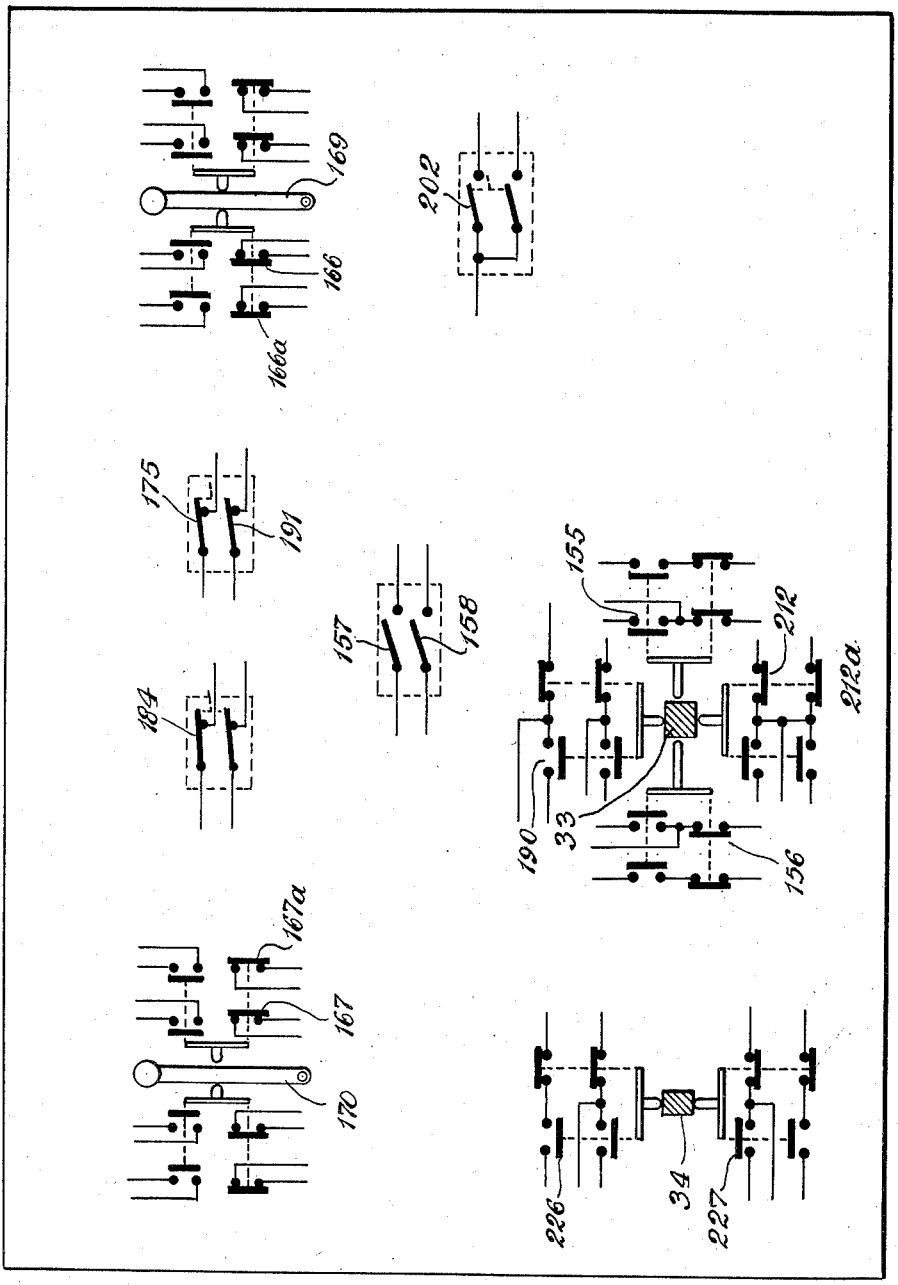

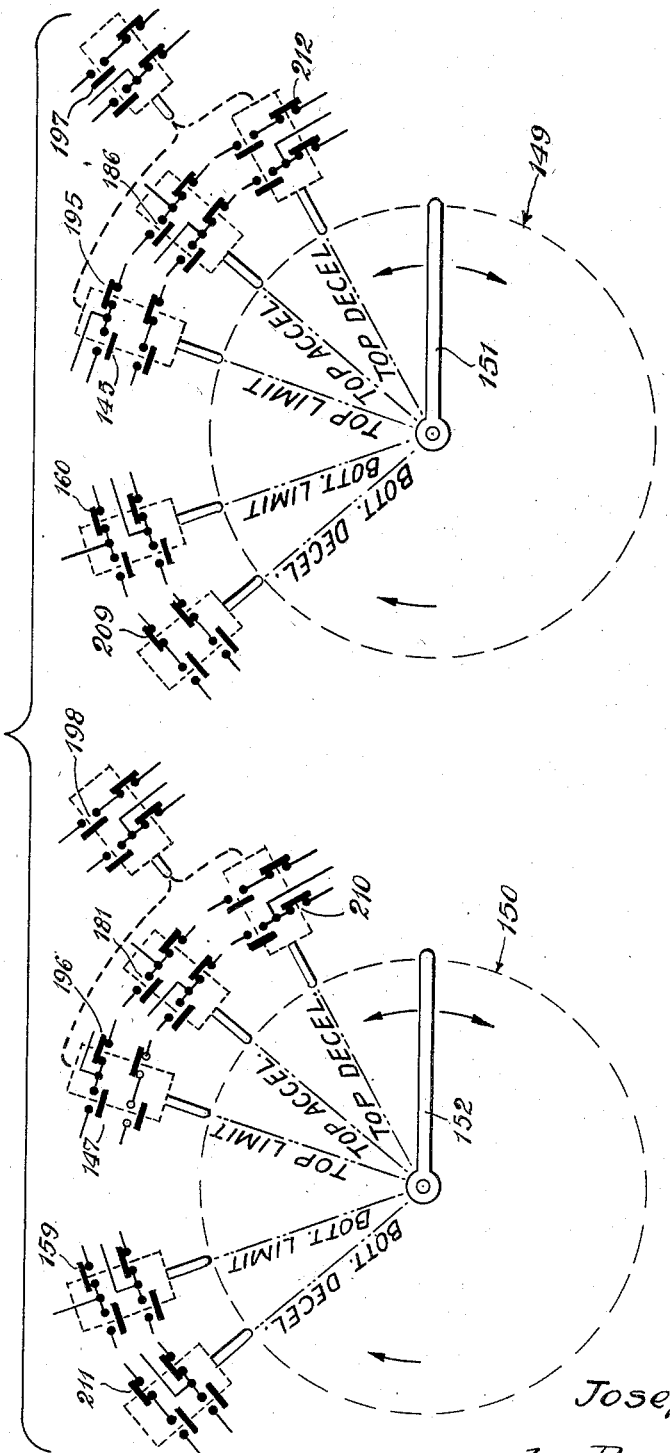

Feb. 18, 1958 J. KELLOGG 2,823,897
POSITIVE HOIST CONTROL
Filed Dec. 13, 1954 14 Sheets-Sheet 13
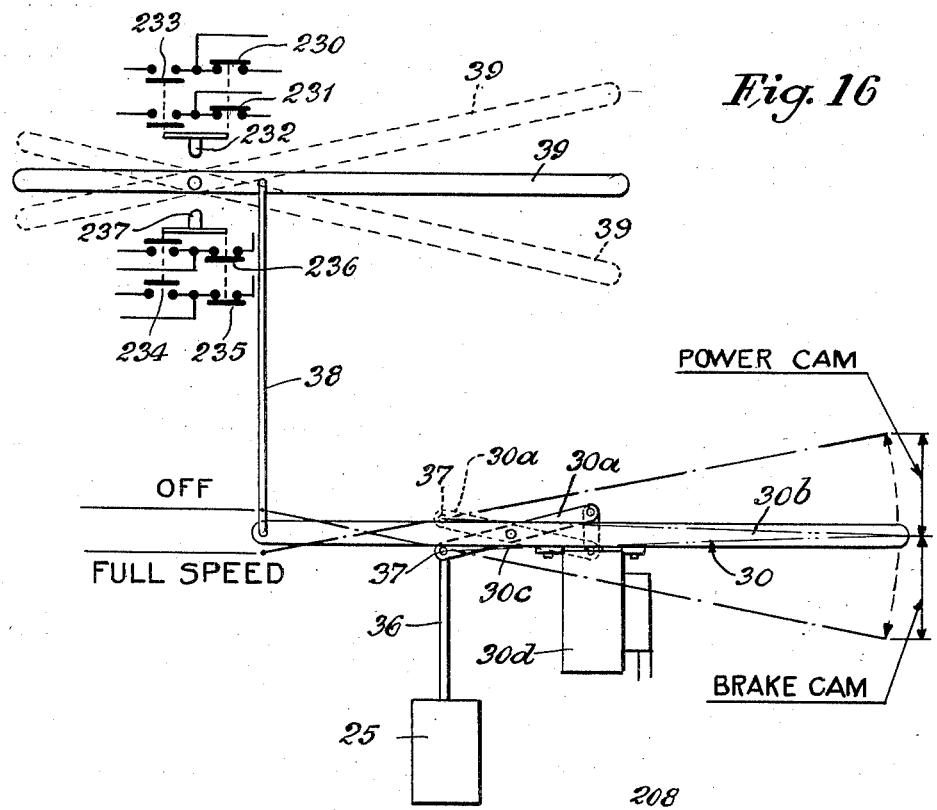
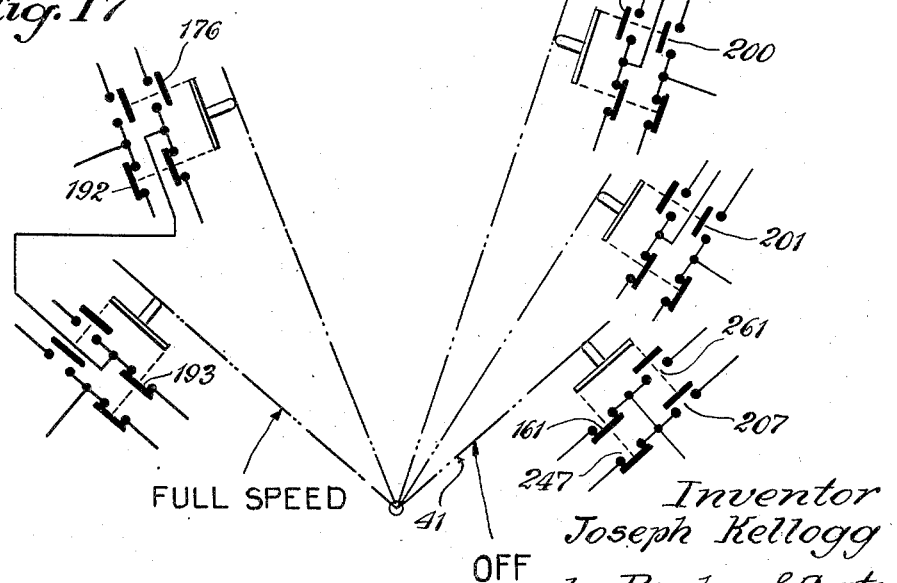
Inventor
Joseph Kellogg
by Parker & Carter
Attorneys

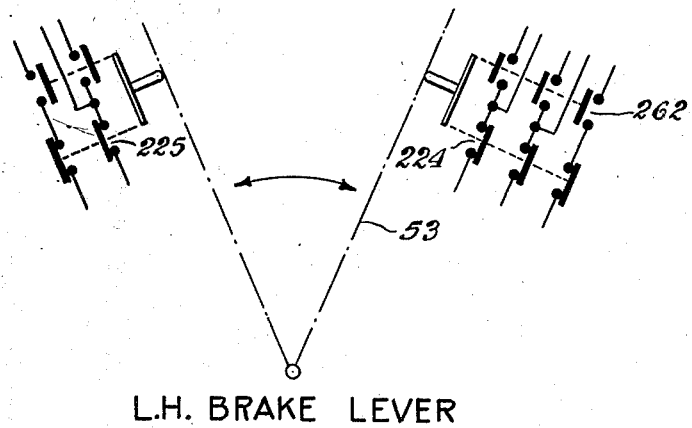
L.H. BRAKE LEVER
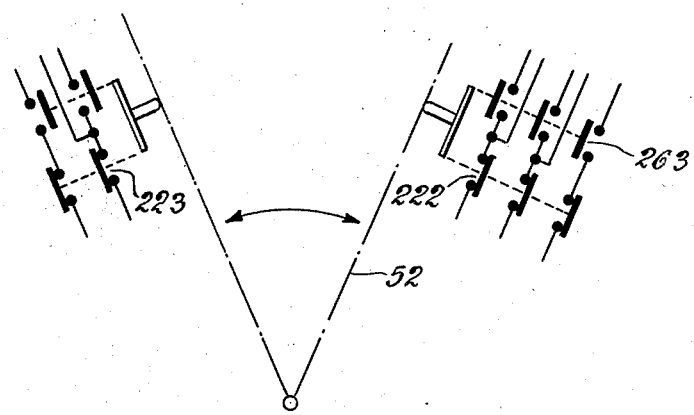
R.H. BRAKE LEVER
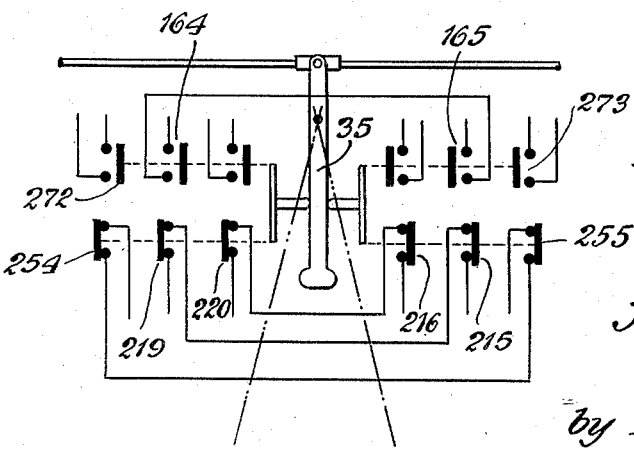

United States Patent Office 2,823,897
Patented Feb. 18, 1958

2,823,897
POSITIVE HOIST CONTROL

Joseph Kellogg, Milwaukee, Wis., assignor to Nordberg Manufacturing Company, Milwaukee, Wis., a corporation of Wisconsin Application December 13, 1954, Serial No. 474,856

25 Claims. (Cl. 254—173)

This invention relates to the art of hoist controls and is particularly concerned with regulation of hoist speed and movements. The invention may be employed with hoisting systems using A. C. power for the hoist drive motor or systems using D. C. power for the hoist drive motor. It has applicability in the art of "double drum hoists" and in the art of the Koepe wheel or friction type of hoists.

Speed control of hoists and other similar systems is effected by proper control of braking effort applied to the hoist and by properly regulating the power applied to the hoist drive motor. The present invention is concerned primarily with a novel coordination of brake regulation and power regulation to effect speed control. Broadly speaking, the invention contemplates a power control or power regulating apparatus and a brake regulating apparatus which are interconnected with a governor so that both of these regulating apparatus are positively controlled by the governor. In my invention the braking pressure exerted on the brake drums by the brake shoes is progressively decreased throughout a predetermined range of speeds. The power applied to the hoist drive motor may be progressively increased, thus forming what is, in effect, a braking control for the system corresponding to all speeds of the hoist and a power control for the same speeds. The governor, power control and brake control are all interconnected with a control lever which is controlled by the operator of the hoisting equipment and the governor maintains the speed demanded by the particular position of the control lever by the coordinated application of the power and the brakes as the particular hoisting conditions may require.

One purpose of the present invention is the provision of a fully automatic alternating current hoisting system.

Another purpose of the present invention is the provision of an improved governing apparatus which is hydraulically actuated in such a manner that the speed of the fluid flowing in a hydraulic system is reflected by a particular linear position of a displaceable member.

Another purpose of the present invention is the provision of a hydraulic governor which has a regulating or output shaft which moves along a linear path and stops at a position precisely indicative of the speed of the hydraulic fluid supplied to the governor and the speed of a motor.

Another purpose of the present invention is a novel system for utilizing two brakes in a power control system wherein one brake is operated automatically by the system and the other is operated as an emergency brake, the operator having selective control over the use of one brake or the other as the automatic brake or emergency brake.

Another purpose of the present invention is the provision of an improved brake applying mechanism which uses movement of a control link to establish predetermined braking pressures and at the same time requires a substantially constant force for moving the control link regardless of the braking pressure called for by the control link.

Another purpose of the present invention is the provision of an improved brake controlling "unbalanced" valve and an improved control linkage for the valve.

Another purpose of the present invention is the provision of a hoisting system which automatically applies the brakes to the hoist whenever overhauling occurs in the hoisting system. Overhauling is that condition occurring where the hoist load drives the prime mover instead of the motor driving the hoist.

Another purpose of the present invention is the provision of a novel operator control system wherein the operator controls movements of a control linkage through electrical means which may be remotely positioned from the control linkage.

Another purpose of the present invention is the provision of a novel speed controlling linkage utilizing a rotatable shaft for controlling both the application of brakes and the application of power to a prime mover and wherein the position of the rotatable shaft is accurately controlled by the combined action of a governor, a control lever positioned by the operator of the system and by a movable member which indicates the actual position of the rotatable shaft.

Another purpose of the present invention is the provision of an improved electrical control circuit for operating hoists either automatically from a remote point or from within the cage of the hoist.

Other objects will appear from time to time in the course of the ensuing specification and claims.

Referring generally now to the drawings:

Figure 3 is a detail view in section of the hydraulic governor shown in Figure 2;

Figure 4 is a detail view of certain elements usable with the governor shown in Figure 3;

Figure 5 is a detail view of certain elements shown in Figure 3;

Figure 6 is a sectional view of the elements shown in Figure 5 taken along the section lines 6—6 of Figure 5;

Figures 10, 11, 12 and 13 are figures representing portions of the complete electrical circuit utilized in the invention and should be considered together as showing the electrical circuit.

Figure 14 is a schematic illustration of certain switches located in the pilot control stand and used with the electrical circuit;

Figure 15 is a diagrammatic illustration of certain limit switches;

Figure 16 is a diagrammatic illustration of certain switches actuated by a portion of the control linkage;

Figure 17 is a diagrammatic showing of certain switches actuated by a control lever of the system;

Figure 18 is a diagrammatic illustration of switches arranged for actuation upon movement of one brake lever;

Figure 19 is a diagrammatic illustration of switches arranged for actuation upon movement of another brake lever;

Figure 20 is a diagrammatic showing of a group of switches selectively actuated by the brake selector lever of the system;

Figure 22 is a sectional view of a balance valve used in the invention.

Figure 1:
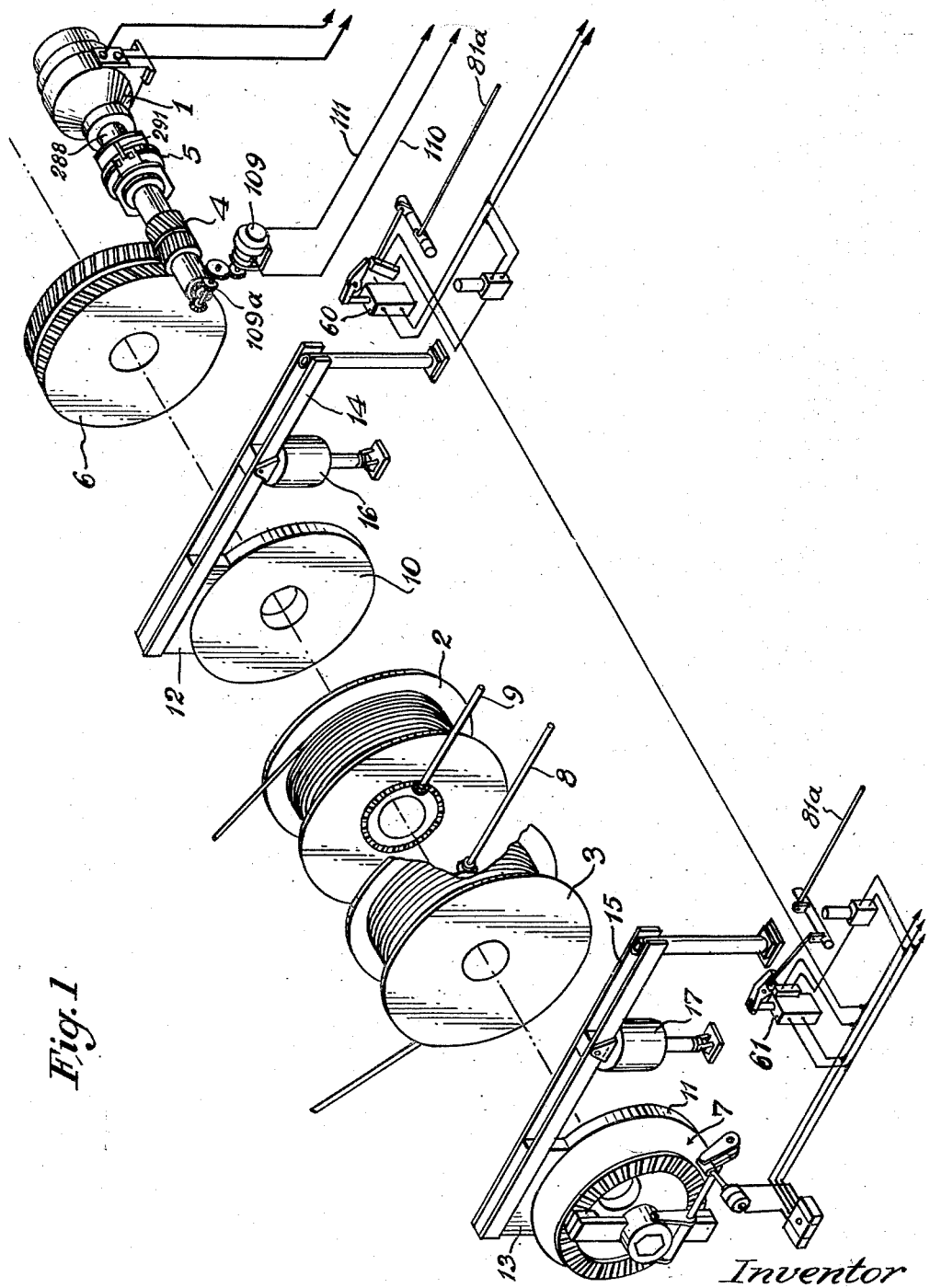
Figure 1 is a diagrammatic view of a typical hoisting installation equipped with my invention.
Figure 2:
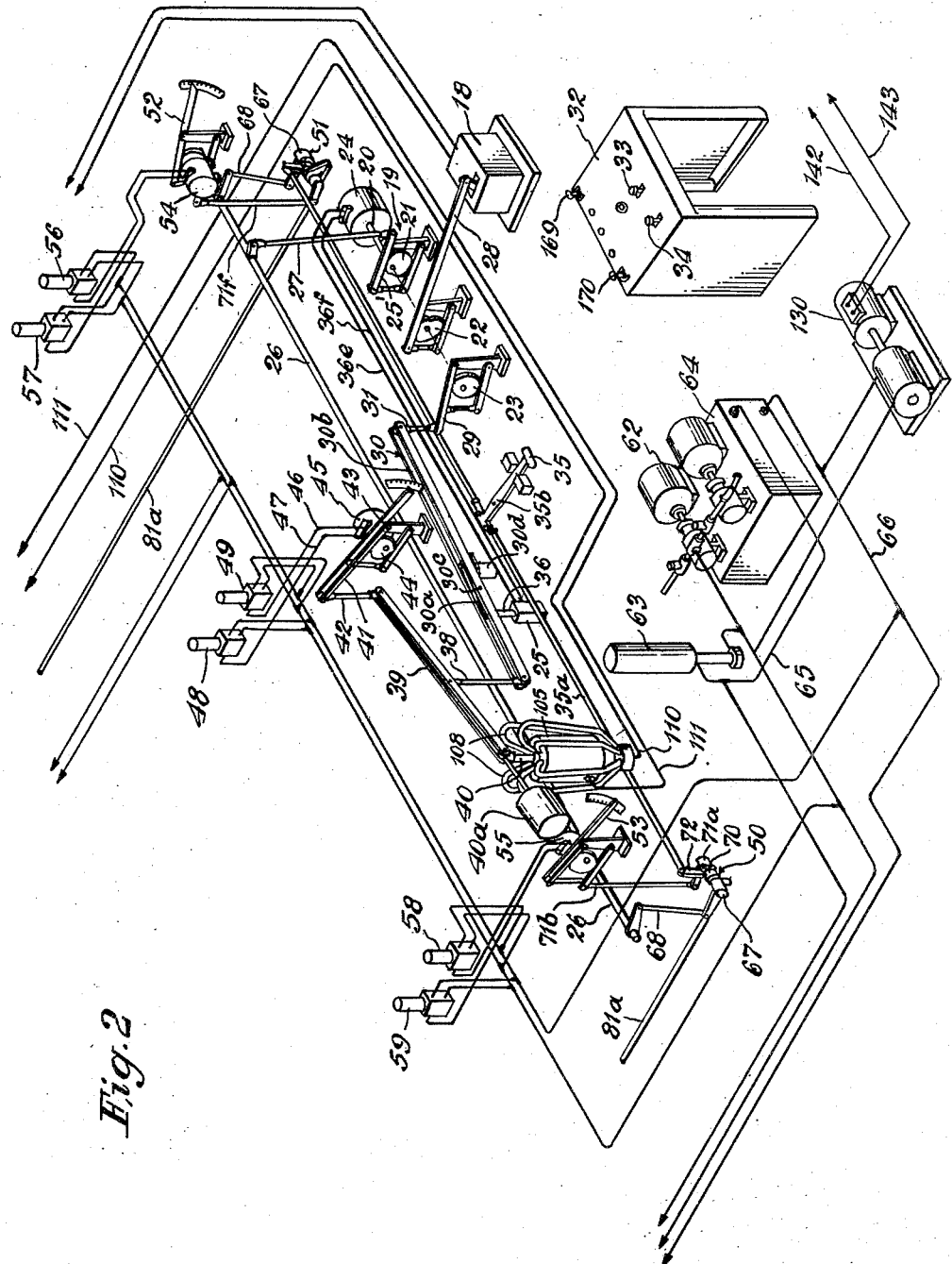
Figure 2 is a continuation of the same diagrammatic showing of Figure 1 and should be studied in conjunction with Figure 1.

Referring specifically now to the drawings wherein like characters designate like elements throughout and in the first instance to Figures 1 and 2, I illustrate the system as applied to a double drum hoist powered by an alternating current motor 1. 2 and 3 represent the two drums of the hoist. In this form of hoist, it is general practice to raise one skip or cage supported by one of the drums while lowering the other skip or cage supported by the other drum. The motor 1 drives a pinion gear 4 through the agency of a coupling 5. The pinion gear 4, in turn, drives a gear assembly 6 which rotates the hoist drums 2 and 3. For clarity of illustration, I have not shown a shaft connecting the gear 6 and the drums 2 and 3, although I wish it to be understood that the drums 2 and 3 and gear 6 are so connected.

Provision may be made for uncoupling either the right-hand drum 2 or the left-hand drum 3 from the shaft, such as by means of a clutch assembly 7 indicated for the left-hand drum. Opposed solenoids may be used to actuate the clutches in a manner familiar to the art.

8 and 9 represent rotatable shafts which are geared to the hoist drums and may be used to actuate limit switches or to actuate any suitable indicating instrument to show the actual position of the particular cage or skip supported by the drums 2 and 3.

A pair of spaced brake drums 10 and 11 are mounted for movement with the hoist drums 2 and 3. As is conventional in the art, brake shoes 12 and 13 are adapted to engage the brake drums 10 and 11 respectively, in order to slow the speed of the hoist or to stop the hoist. Each of the brake shoes 12 and 13 are carried by a lever 14 and 15 respectively, which are pivotally mounted on any suitable supporting stand or the like. When thus mounted, the weight of the lever and the brake shoe tends to set the brake shoe tightly against the brake drum.

In order to release the brake shoes from the brake drums, hydraulic cylinders 16 and 17 are employed. These cylinders are interconnected between the levers 14 and 15 and a base. They are supplied with hydraulic fluid under pressure to raise the levers 14 and 15 and release the brake shoes 12 and 13. By varying the pressure of the hydraulic fluid supplied to the cylinders 16 and 17, the amount of braking effort applied to the brake drums 10 and 11 may be varied.

I have represented more or less diagrammatically at 18 a mechanism for controlling the power applied to the motor 1 and, accordingly, the speed of the motor 1. This mechanism may take the form of a series of resistances adapted to be successively "cut in" to the rotor of the motor 1 and thus vary the speed of the motor 1. It may be any known mechanism for changing the speed of the motor 1, as desired. I do not wish to be limited to any particular form of mechanism for varying the power input to the motor 1 or for varying the speed of the motor 1 and the mechanism 18 should be taken as typical of any known power control means for accomplishing this end.

The hoisting system thus far described is more or less typical of present day double drum hoisting assemblies.

In order to effectively control the application of the power applied to the motor 1 and the braking pressure applied by the brake shoes 12 and 13, I employ a cam unit represented generally at 19. The cam unit includes a rotatable shaft 20 carrying a brake control cam 21, a power control cam 22 and a third cam 23. The shaft 20 is rotated by a vane type hydraulic motor 24, which is controlled by a pilot valve 25. The brake cam 21, during rotation thereof, is adapted to raise and lower a cam follower link 25', which is interconnected with a rotatable shaft 26 by means of a link 27. Raising and lowering of the link 25 rotates the shaft 26 and applies the brakes in varying degrees as required in the system. The power control cam 22 similarly raises and lowers a cam follower link 28, which actuates the power control mechanism 18. A third cam 23 similarly raises and lowers a link or cam follower 29, which is connected to a floating lever 30 through a link 31.

The cam followers for the cams 21, 22 and 23 are each advantageously formed by parallel, connected links which carry cam follower rollers and move in unison with one another so as to give "positive" cam action. Each of the cam followers shown and described herein are formed in the same manner.

The cams 21, 22 and 23 are given configurations such as to produce a particular sequence of controlling events. The cams 21 and 22 may, for example, be shaped so that when the cam 21 is at its low point of travel, the cam 22 is at its high point of travel and vice versa. In this manner full power may be applied to the hoist when the brakes are totally released and conversely the power may be reduced to a minimum when full braking effect is delivered by the brake shoes. By controlling the position of the shaft or member 20, the speed of the hoist is effectively controlled.

32 represents an operator's control stand which may have a pilot control lever 33 adapted to control both the brakes and the power, as well as selecting which cage or skip is to be hoisted in a manner to be described. The control stand may also include an emergency brake applying pilot lever 34. The control stand may include any desired number of the controlling elements in the electrical circuit which will be explained in ensuing portions of this specification. It may have embodied therein a brake selection lever 35 connected to a rod 35a and pivotally mounted on a support as at 35b to select a brake to be operated automatically and a brake to be operated as an emergency brake, although in Figure 2 this selector lever is shown in a position away from the control stand. Other indicating instruments, such as position indicators, speed indicators, and the like may be included in the control stand. The entire controlling system, or any part thereof, may if desired be positioned in a control stand or panel although the controlling elements are shown in a position away from the control stand in Figures 1 and 2 for clarity of illustration.

The pilot valve 25 (Figure 22) is preferably a balance valve having a movable plunger 36 which, upon movement thereof, selectivley delivers fluid to one side or the other of the motor 24, depending upon the direction of rotation desired in the motor 24. The valve plunger 36 may be biased toward a neutral position shown in Figure 22 by a spring, 36a and 36b. Spaced ports 36c and 36d may selectively deliver fluid and exhaust fluid from conduits 36e and 36f, leading to opposite sides of the vane in motor 24 upon movement of the plunger 36 in opposite directions. The valve may include a pressure inlet port 36g (for supplying fluid from a source such as an accumulator) and spaced exhaust ports 36h and 36i which selectively communicate with the ports 36c and 36d on movement of the plunger away from neutral position. This form of balance valve, in itself, should be taken as illustrative of a valve adapted to control the position of the vane in an hydraulic motor upon small movements of the valve plunger in opposite directions. The plunger 36 of the valve is interconnected with the floating lever 30 as at 37 shown, for example, in Fig. 16. The floating lever 30 is interconnected through a pair of links 38 and 39 with a displaceable shaft 40 of an hydraulic governor and with a control lever 41, the position of which is controlled by the operator of the hoist, or automatically, as desired. In the arrangement shown, the plunger 36 is connected to the floating lever 30 between the connection of the floating lever 30 with the link 31 and the connection with the link 38. As will be clear in Figure 2, the link 38 is pivoted to the link 39 intermediate its ends. One end of the link 39 is pivotally connected to the displaceable shaft 40 of the governor and the other end thereof is interconnected, through a link 42, with the control lever 41.

The control lever 41 is adapted to be moved about its pivotal axis 43 by means of a cam 44, which is rotated by a vane type fluid motor 45. The motor 45 is supplied with hydraulic fluid through conduits 46 and 47. The fluid delivered through these conduits is selectively controlled by solenoid valves 48 and 49. Energization of one of the valves moves the motor and cam 44 in one direction and de-energization of the other valve moves the motor and cam in the other direction. The position of the lever 41 is controlled by selectively energizing or de-energizing the solenoids 48 and 49 for whatever period of time required to move the lever 41 to the desired position.

The brake selecting lever 35 is interconnected with clutch units 50 and 51. These units are adapted to alternatively couple brake control levers 52 and 53 to the brake control shaft 26 or to uncouple them, as the case may require. Each of the levers 52 and 53 are rotated by cams driven by vane type hydraulic motors 54 and 55 respectively. The motors 54 and 55 are moved in one direction or the other by the selective energization of solenoid controlled valves 56, 57 and 58, 59, respectively. When the lever 35 is moved so as to shift the rod 35a to the right as shown in Figure 2, the result is to couple the lever 53 to the brake control shaft 26, and to uncouple the brake control lever 52 from the brake control shaft 26. The brake control shaft 26 is adapted to be coupled to brake valve control assemblies represented generally at 60 and 61 respectively, so that rotation of the brake control shaft 26 controls the braking effort delivered by the brake shoes 12 and 13.

Figure 21:
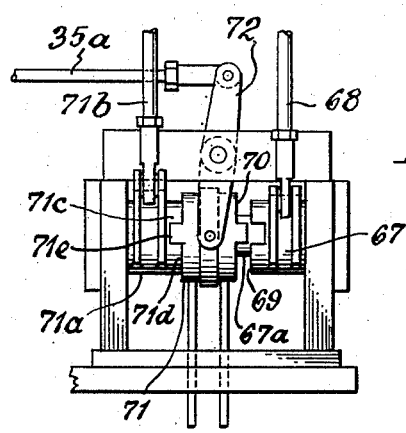
Figure 21 is a sectional illustration of a clutch assembly utilized in the brake control linkage.

A second collar 71c in Fig. 21 is mounted on shaft 67a and has a clutch face 71d cooperable with a clutch face 71e on sleeve 71. Collar 71c is connected to the brake lever 52 through a link 71f so as to rotate in response to rotation of lever 52.

As will be seen best in Figure 21 wherein a typical clutch unit is illustrated, each clutch includes a first collar 67 rotatably mounted on the shaft 67a and connected as by means of a link 68 for movement with the brake control shaft 26. The member 67 has a clutch face 69 cooperable with a clutch face 70 carried by a sleeve 71, mounted on the shaft for axial movement toward and away from the clutch face 69. Sleeve 71 carries a crank 71a which in turn is connected through a rod 71b with the associated brake valve control assembly. The sleeve 71 is adapted to be moved axially into selective engagement with the collar 67 or collar 71c by means of a pivotal link 72, interconnecting the rod 35a and the sleeve 71.

Upon movement of the lever 35 to one side or the other, one rod 71b will be coupled to one brake lever and the other rod 71b will be coupled to the shaft 26. In my invention, the brake having its control valve assembly operated by the rod 26 is the normal braking means and the other brake which has its control valve operated by the brake control lever is the emergency brake.

Fluid for the brake cylinders 16 and 17, as well as the motors 24, 45, 54 and 55 is supplied from a hydraulic circuit which includes a pump unit 62 in Fig. 2, accumulator 63, and reservoir 64. Fluid is delivered from the pump unit through a delivery conduit 65 and a return conduit 66.

Figure 7:
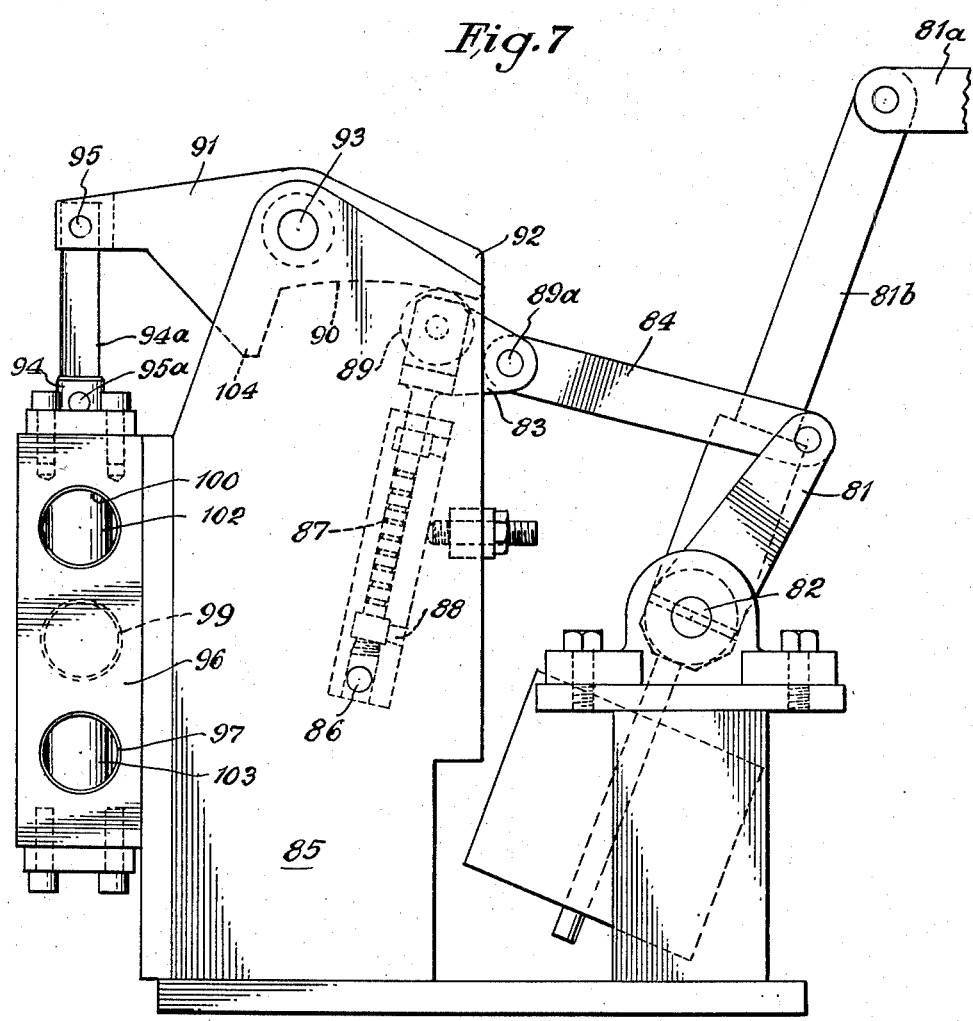
Figure 7 is a schematic showing of a portion of the brake applying mechanism which is illustrated in Figure 1.
Figure 8:
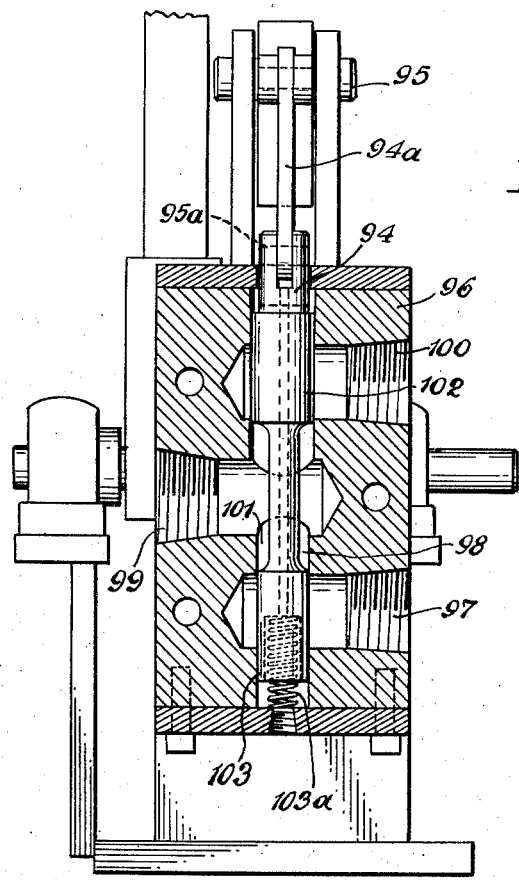
Figure 8 is a detail view in section of a valve shown in Figure 7.

Each of the brake valve control assemblies 60 and 61 are identical in structure and operation and for this reason only one will be described in detail. A typical control assembly is illustrated in Figures 7 and 8. This assembly includes a lever 81 which is mounted for rotation with a shaft 82, which in turn is rotated from the brake control shaft 26 or brake control lever 52 or 53 as by means of the rod 81a and crank 81b. The lever 81 is interconnected with a second lever 83 by means of a link 84. The lever 83 is pivotally mounted on a support 85, as at 86. The lever or member 83 has a bore formed therein and a plunger 87 is mounted in this bore. The pressure from the normal brake operating system (the accumulator 63) is fed into this bore through an inlet 88 and serves to force the plunger 87 upwardly. This pressure is maintained at a substantially constant level. At its outer end, the plunger carries a roller 89 with which the link 84 is connected as at 89a. This roller 89 rides in an arcuate track 90 formed in a rocker arm 91 mounted on the support. The track 90 extends from one end 92 of the rocker arm to a point generally below the pivot 93 of the arm. The arm 91 is connected at its other end to a valve plunger 94 through a link 94a and any suitable pivotal connections 95 and 95a. The valve plunger 94 works in a valve body 96 (Figure 8). The valve body 96 has a pressure port 97 communicating through a chamber 98 with an intermediate port 99 communicating with the cylinder 16 and an exhaust port 100.

The valve plunger includes a reduced intermediate portion 101 and a spool 102 which is adapted to open and close the exhaust port. The plunger also includes a spool 103 which is adapted to open and close the pressure port to the chamber. The spool 102 is slightly larger in diameter than the spool 103 and the portion of the bore accommodating this spool is correspondingly larger than the bore accommodating the spool 103. A spring 103a biases the plunger upwardly toward the exhaust position. Pressure developed in the brake operating cylinder is transmitted to the chamber through the port 99 and in view of the slightly larger area of the spool 102, this pressure tends to raise the valve plunger which will open the cylinder to the exhaust port 100 and thus tend to apply the brakes. The pressure in the cylinder will always be directing an upward thrust through the pivot pin 95 to the arm 91. This force, however, is opposed by the downward force exerted on the plunger 87. As the lever 83 and the plunger 87 are moved inwardly toward the pivot 93, the effective force exerted on the rocker arm by the lever 83 and plunger 87 will be less and the valve plunger 94 will move upwardly to a point where the force exerted on the balance lever from the pressure in the cylinder balances the pressure exerted on the rocker arm by the plunger 87. In the balanced position both exhaust port 100 and pressure port 97 are closed off from the cylinder port 99.

Thus, for each different position of the lever 81, a different cylinder pressure is necessary to balance the force exerted by the plunger 87. This results in a different brake applying force.

The arm 91 also includes a depending portion 104 which is positioned for contact by the roller 89 when the roller 89 is at its inward extremity of movement. When the roller strikes the depending portion 104, the brake lever 81 is calling for a minimum of pressure in the cylinder 16 and full brake applying force. The result is a positive mechanical action between the roller 89 and the portion 104 which forces the valve plunger 94 upwardly and rapidly exhausts all the fluid from the brake cylinder, thus applying full brake operating effort. Should the valve plunger 94 stick for any reason, this positive engagement will insure application of the brakes.

In Figures 3 and 4, I illustrate in detail the hydraulic governor for the assembly. As illustrated, the governor includes a casing or housing 105 which is formed as a shell surrounding and spaced from an interior sleeve 106. The sleeve 106 has a central bore 107 having its axis extending vertical. The bore 107 is supplied with fluid under pressure through a series of conduits 108, which are spaced about the axis of the bore and which communicate with the upper portion of the bore 107. This spacing of the conduits 108 holds turbulence to a minimum. These conduits 108 are supplied with hydraulic fluid from a pump 109 in Fig. 1 which is driven by the pinion gear 4 of the motor 1. The pump communicates with conduits 108 through conduit 110. The speed of the pump, which is a positive displacement pump, corresponds to the speed of the motor 1 and, accordingly, the speed of the hoisting drums 2 and 3. The pump is geared to the hoist through a transmission 109a that assures the same direction of rotation of the pump, regardless of the direction of rotation of the hoist drums. The volume of fluid, per unit time, delivered by the pump 109 to the conduit 108 is therefore dependent upon the speed of the hoist. Preferably the governor and pump are part of a closed hydraulic circuit so that fluid exhausted from the governor is delivered to the pump inlet.

The displaceable shaft 40, which is interconnected with the floating lever 30, extends into the bore 107. As shown in the drawings, the bore 107 is comprised of an upper portion 112 and a lower portion 113. The lower portion of the shaft 40 is generally enlarged, as at 114, and makes a snug fit with a rim 115 positioned generally intermediate the ends of the bore 107. The rim 115 serves to separate the upper portion 112 from the lower portion 113. The lower portion 113 has a gradually increasing diameter from the bottom thereof to the top thereof, so as to define a gradually increasing cross-sectional area. Passageways 116 communicate with the upper portion of the lower bore below the rim 115 and the space between the shell 105 and the sleeve 106. The enlarged portion 114 of the shaft has a length at least equal to the length of the lower portion of the bore 113. At its lower end, the shaft includes a rim 117 which flares outwardly from the axis of the shaft. The diameter of the lowermost portion of this rim is slightly less than the diameter of the bore 113 at the lowermost portion thereof, so as to define a small passage for the flow of fluid between the rim and wall of the bore regardless of the position of the shaft.

The shaft 40 has a hollow interior and has a generally elongated valve stem 118 mounted therein. Passageways 119 establish communication with the upper portion 112 of the bore and the interior of the shaft. As shown, these passageways are formed at the uppermost part of the enlarged portion 114 of the shaft. The stem 118 carries a disc shaped member 120 at the lower portion thereof (Figures 5 and 6). A plurality of fins 121 are positioned above the disc and extend to a point where they snugly abut against the wall of the bore and the shaft and thus center the stem. When the stem 118 is raised, communication is closed off between the interior of the shaft and the lower portion 113 of the bore. If the stem is lowered a small amount, it will allow the passage of fluid from the interior of the shaft to the lower portion 113 of the bore. Preferably the thickness of the disc portion is decreased progressively between the fins, as shown in Figure 5 so that upon closing movement of the disc, the effective passageway for fluid is gradually diminished to a point where several minute areas (at the thinnest portions of the discs) are available for passage of fluid.

A spring 122 surrounds the stem 118 at the upper portion thereof and works against a shoulder 123 formed in the shaft and a boss 124 on the upper portion of the stem, thus tending to bias the stem upwardly to a position where it closes off all communication between the interior of the shaft and the lower portion of the bore.

When fluid is delivered by the pump 109 to the upper portion 112 of the bore, it flows at a speed corresponding to the speed of the hoist. It passes through the passageways 119 into the interior of the shaft and works its way downward against the valve disc 120. If the pressure below the shaft is less than the pressure in the interior, the valve will be opened and hydraulic fluid will escape to the lower portion 113 of this bore. This in turn builds up the pressure below the shaft. If this condition continues it causes a rising movement of the shaft 40. The shaft 40 will rise to a point where the pressure beneath the shaft in the lower portion of the bore 113 is equal to the pressure exerted on the shaft from above. If the pressure in the lower portion of the bore 113 continues building up it will force the shaft upwardly and in moving the shaft upwardly, it will increase the effective cross-sectional area between the rim 117 and the wall of the bore, thus increasing the effective area for the passage of fluid therebetween. The shaft stops at a position where the effective area is sufficient to balance the pressure below the shaft and the pressure exerted on the shaft from above. With this form of governor, the extension of the shaft 40 with respect to the casing 105 is directly proportional to the speed of the pump or hoist.

If the speed of fluid above the enlarged portion of the shaft decreases, the shaft 40 will move downwardly a distance proportional to the decrease. Conversely, an increase in speed results in upward movement of the shaft.

In Figure 4, I illustrate a variant form of valve stem for the shaft 40. In this figure the valve stem 118a is provided with a sylphon 118b intermediate its length, so as to expand and contract with changes of temperature. As the temperature of the fluid passing into the interior of the shaft increases, it becomes less viscous, which tends to lower shaft 40. This increase in temperature expands the sylphon and lengthens the stem 118a. Lengthening the stem 118a lowers the position of valve disc 120 causing a pressure drop in the chamber 112 and an attendant rise in the shaft 40. The sylphon 118b is so proportioned to keep shaft 40 in practically its proper relation regardless of temperature changes in the fluid caused by work and surrounding atmospheric temperature changes.

The sylphon is filled with a substance of rapid expanding qualities with increasing temperatures.

A weight counterpoise 40a, in Fig. 2, may be carried by the lever so as to aid the pressure above the piston 114 in chamber 112. The weight 40a is effective to offset a lag encountered on the part of shaft 40 to properly recede as speed diminishes, as in rapid decelerations.

In Figure 16, I illustrate the operation of the floating lever 30 in detail. In this figure it will be seen that the floating lever 30 includes two levers, 30a and 30b, pivoted together as at 30c. One lever 30a is pivotally connected to the upper portion of the valve plunger 36. Solenoid 30d is carried by the lever 30b and has a plunger pivotally connected to the lever 30a. When the solenoid 30d is energized, the two levers 30a and 30b occupy the relative position shown in Figure 16. This makes the lever 30 effective to vary power and causes power variation for all speeds of the hoist in accordance with the position of the control lever 41. When the solenoid 30d is de-energized, however, it causes a relative clockwise rotation of the lever 30a with respect to the lever 30b about the pivot 30c. This relative rotation has the effect of shifting the valve plunger 36 in an upward direction. This has the effect of making the control lever 41 and governor 40 effective in the braking range for all speeds.

In the normal operation of the system, rotation of the control lever 41 about the pivot 43 in a counterclockwise direction as shown in Figure 2 will force the link 38 downwardly. This, in turn, forces the valve plunger 36 downwardly so as to deliver fluid to the motor 24 in a direction such as to rotate the shaft 20 to a position calling for more power and speed from the motor 1. As the shaft 20 is rotated, the brake cam 21 causes a rotation of the brake control shaft 26 in a direction such as to gradually release the brake shoe 12 or 13, depending upon which brake is operated automatically. As the shaft 20 is rotated, however, the cam is rotated in a direction such as to raise the link 31, which has the result of raising the valve plunger 36. As the speed of the hoist picks up, the displaceable shaft 40 of the governor will rise, thus raising the link 38 and also raising the valve plunger 36. Thus the displaceable shaft 40 of the governor and the link 31 acts in a direction opposing the action of the control lever 41.

As the control lever 41 is moved in the opposite direction, the opposite result takes place. Initial rotation of the lever 41 raises the valve plunger 36 and as the valve plunger 36 is raised, the cam 23 will be rotated in a direction tending to lower the valve plunger 36. When the control lever 41 is moved in this direction, it is calling for a smaller amount of speed in the hoist and as the speed of the hoist decreases, the displaceable shaft 40 of the governor will fall, thus lowering the valve plunger 36. The action of the link 38 anticipates the action of the governor in regulating the valve plunger 36. Its action alone is never sufficient to bring the plunger to the neutral or "balanced" position after the plunger 36 has been displaced by the movement of the control lever.

If the rotation of the control lever 41 in either direction is comparatively large, the rotation of the cam 23 and the displacement of the shaft 40 must also be comparatively large before the valve plunger 36 will be brought back to the neutral or balanced position. Thus, at any position of the control lever 41, a definite corresponding speed will result in the hoist or in the drive motor 1.

I wish it to be understood that I have mentioned counter-clockwise rotation of the control lever 41 as calling for more speed in an illustrative sense. The system may be arranged so that either counterclockwise rotation or clockwise rotation of the control lever 41 will increase the speed of the hoist.

The control lever has a range of movement which corresponds to definite predetermined speeds of the hoist. For a predetermined percentage of the movement of the control lever away from a neutral position, where the hoist is at rest, the hoist will be in what can be termed a braking range. For example, this braking range may be effective throughout some 30 or 40% of the movement of the control lever 41. As the control lever moves through this portion of its movement, the braking effort will be gradually diminished and as the control lever 41 moves throughout the remainder of its range of movement, the brakes are totally released and speed is dependent only upon the power input to the motor 1. The range of movement of the control lever corresponding to the braking range may be preselected and set at any desired amount by giving the brake cam 21 a configuration such as to maintain the operation of the brakes for a corresponding proportion of the movement of the rotatable shaft 20. The power control cam 22 may also be given a configuration such as to apply power in progressively increasing amounts as the shaft 20 is rotated. I find it advantageous to locate the high points of the brake control cam 21 and power control cam 22 approximately 90° out of phase with one another, so that a 180 degree movement of the shaft 20 regulates the speed from a condition wherein the brakes are fully on the power is fully off to a condition where the brakes are fully off and the power is fully on. The brake cam has a dwell when the power cam is acting. The power cam has a dwell when the brake cam is acting. The floating lever solenoid causes a rapid change from one to the other.

From the foregoing, it will be seen that adjustment of the floating lever 30 brings about an adjustment of the valve 25 in a manner such as to move the rotatable shaft 20 to whatever position is required to maintain the speed demanded by the control lever 41 position.

In my invention I maintain the solenoid 30d energized during normal operation of the hoist. I use the solenoid 30d for the purpose of adjusting the floating lever 30 in a manner as to shift the valve plunger 36 in an upward direction, which rotates the motor 24 and shaft 20 in the turn-off direction and into the braking range where the brake cam is effective. The arrangement is such that the solenoid, when de-energized, will shift the valve plunger 36 in a direction and amount such as to rotate the shaft 20 into the braking range and apply the brakes as required. When this happens the brakes are applied in whatever degree necessary to maintain the speed set up by the position of the control lever.

I have illustrated the control lever 41 as being rotated by the motor 45 and the cam 44. In lieu of employing the motor 45 and cam 44, the control lever 41 may be provided with a handle so that it may be moved manually by the operator of the hoist and set, by the operator, at a position corresponding to a preselected speed of the hoist. The same is true of the brake levers 53 and 52. Each of these, under some circumstances, may be manually actuated in lieu of the motors 54 and 55.

In Figures 10, 11, 12 and 13, I illustrate a controlling circuit which is particularly adapted for use in my invention. The control circuit shown is for "double drum hoisting," and an A. C. hoist motor although I wish it to be understood that certain principles utilized in the circuit can be applied in other forms of hoists. I illustrate the circuit as applied to a hoisting system wherein the skip or cage is adapted to be moved between an upper level and lower level. If desired, suitable arrangements can be made to apply this form of controlling circuit to a hoisting system which is adapted to move a skip or cage to any number of levels.

In my system, I provide electrical power for the controlling circuitry by means of an hydraulically driven generator, indicated generally at 130. This generator is driven whenever the hydraulic circuit is energized, so that as long as there is hydraulic pressure in the accumulator of the hydraulic circuit, the generator will be driven to provide power for the controlling circuit. The generator 130 supplies power for a directional control circuit having a relay 131 which is energized whenever it is desired to raise the right-hand drum and a relay 132 which is energized whenever it is desired to raise the left-hand hoist drum. Although I have not illustrated them in the drawings, the relays 131 and 132 may be employed to close directional contactors for the drive motor 1, so that upon selective energization of the relays 131 and 132, the motor 1 will be driven in one direction or the other. Directional contactors of this type are known to the art and since they, in themselves, form no part of the present invention, I have omitted them from the drawings.

A control lever circuit is also supplied with power from the generator 130. The control lever circuit includes the solenoids 48 and 49 which control the valves delivering fluid to the motor 45 which controls the position of the control lever 41. In the system as shown, the solenoid 49 is adapted, upon energization to open its valve which delivers fluid to the motor 45 in a direction such as to rotate the control lever 41 in the "turn on" direction. As long as this solenoid is energized, the vane of the motor 45 will revolve and will gradually move the control lever 41 into the fullspeed position. The solenoid 48 is adapted, when de-energized, to actuate its valve so as to deliver fluid to the motor 45 in such a way as to move it in the opposite direction and, accordingly, move the control lever 41 into the off position. As long as the solenoid 48 is de-energized, the vane of the motor 45 and the control lever 41 will revolve in a direction which reduces the speed of the hoist and the control lever 41 will continue to revolve until it reaches the fully off position. When the solenoid 48 is energized and solenoid 49 is de-energized, the vane of the motor, and therefore the control lever 41, is held in a static position. The control lever circuit also includes a turn on control relay 133, a slow speed relay 134 and a turn-off control relay 135, which are employed for purposes which will be pointed out.

The circuit also includes a brake operating portion. This portion includes the solenoids 56 and 57 which control the rotation and position of the fluid motor 54 and brake lever 52 and solenoids 58 and 59, which control the rotation and position of the motor 55 and brake lever 53. For purposes of illustration, it will be assumed that the solenoid 56 through its associated valve rotates the motor 54 and lever 52 in a direction tending to apply the brakes, while the solenoid 57 through its associated valve controls the application of fluid to the motor 54 in such a manner as to turn off the brake lever 52 and thus release the brakes. Similarly, the solenoid 58 will be assumed to control the application of fluid to the motor 55 in such a manner as to "turn off" the lever 55 and apply the brakes whenever the solenoid 58 is energized. The solenoid 59, when energized, will be assumed to control the valve associated therewith in such a way that the vane of the motor 55, and accordingly the brake lever 53, are rotated in directions such as to turn off the brake lever 53 and thus release the brakes.

This portion of the circuit also includes a solenoid 136 which controls a valve associated therewith which, in turn, controls the application of fluid to the bore 87 of the right-hand brake valve control linkage, shown in Figure 1. Whenever the solenoid 136 is energized, fluid is delivered to the bore 87, thus rendering the right-hand brake valve controlling assembly effective. When this solenoid is de-energized, however, fluid is exhausted from the bore 87 and this has the result of allowing the plunger 94 of the brake control valve to move upwardly and thus exhaust fluid from the brake cylinder 16 and apply the brakes.

A similar brake release solenoid 137 is provided for the left-hand brake operating assembly, shown in Figure 1. This solenoid functions in the same manner as the solenoid 136. When it is energized, the left-hand brake valve control assembly is effective. When it is de-energized, the assembly is ineffective and the brakes will be applied.

The circuit also includes a clutch operating circuit. As shown, solenoids 138 and 139 control the engagement and disengagement of the right-hand clutch. It will be assumed that whenever the solenoid 138 is energized, the right-hand clutch for the assembly will be engaged and the right-hand drum 2 will be coupled to the drive shaft. When the solenoid 139 is energized, the solenoid 138 is de-energized and under this condition, the right-hand clutch is disengaged so as to disengage the right-hand drum from the drive shaft. Designated generally at 140 and 141 are solenoids which are similar to the solenoids 138 and 139 in function. The solenoids 140 and 141, however, are adapted to control the engagement and disengagement of the left-hand clutch of the assembly. Hoist drum clutches of this general type are well known in the art and since they in themselves form no part of the present invention, I have illustrated clutches of this type in the drawings as at 7 in Figure 1 diagrammatically. I have illustrated the clutch operating solenoids for the purpose of showing their relation to the remainder of the controlling circuit. It should be understood that the clutches normally associated with the right-hand and left-hand drums are employed so as to change the relative positions of the skips or cages with respect to one another while holding one skip or cage stationary. This may be necessary from time to time to compensate for stretching of the hoist cables and to spot the skips or cages for convenience of hoisting from different levels.

The controlling circuit also includes a portion which is designed to apply the brakes to the hoist whenever "overhauling" occurs. This portion of the circuit is illustrated in Figure 13 and it includes the solenoid 30d which is interconnected with the floating lever 30 of the control linkage.

Each portion of the control circuit just described is connected across lines 142 and 143 from the generator 130.

In the directional control circuit I include a switch 145 which is adapted to be opened when the right-hand cage is at its upper limit of travel. During normal operation, this switch 145 is closed and it energizes a relay 146 which actuates certain switches. I also include a limit switch 147 which is adapted to be opened when the left-hand cage is at its upper limit of travel. During normal operation, this switch will be closed and it will energize the relay 148 which, in turn, actuates certain switches. In Figure 15, I illustrate, diagrammatically, a system for opening the switches 145 and 147 in this manner. A first switch assembly 149 is employed for the right-hand drum and a second switch assembly 150 is employed for the left-hand drum. Each of these switch assemblies are geared to the hoist drive, as for example through the shafts 8 and 9, and they include rotatable switch actuating arms 151 and 152, respectively, that are geared to the hoist drive or drums, so that they rotate with the movement of the hoist drums. They are arranged so that a movement of the arm through something less than 360 degrees corresponds to the full range of travel of the cages or skips association with the drums.

The switch assemblies 149 and 150 may take the form of "multi deck" switches so that movement of the arms closes and opens various circuits associated therewith in predetermined timed sequence.

This general form of switch assembly and rotatable actuating member is conventional in the art and for this reason, I have illustrated it in a diagrammatic manner in Figure 15.

The directional control circuit also includes a switch 132a which is in the line leading to the relay 131. The switch 132a is normally closed but it is opened by the energization of the relay 132 which, may close a directional contactor (not shown) to rotate the hoist drive motor in a direction so as to raise the left-hand cage. A similar switch 131a is provided in the line leading to the relay 132. This switch 131a is normally closed and is opened by the energization of the relay 131. Relay 131 serves to operate the motor in the opposite direction. A switch 146a is provided in a parallel line leading to the relay 131. It is normally closed and is opened whenever the relay 146 is energized. A switch 148a is in a parallel line leading to the relay 132. It is opened whenever the relay 148 is energized.

A right-hand limit switch 153 is provided in the main line between the switch 132a and the relay 131. A similar switch 154 is provided in the main line leading from the switch 131a to the relay 132. The switches 153 and 154 are each direct limit switches and may be located in the hoist shaft for operation by the cages. They will open whenever the skip or cage is at its upper limit of travel. For example, the switch 153 may be opened whenever the right-hand skip or cage is at its upper limit of travel. Similarly, the switch 154 will be open whenever the left-hand skip or cage is at its upper limit of travel. The switches 153 and 154 cut out their associated relays when the cage is actually at the upper level, whereas the limit switches 145 and 147 perform their controlling function when the drums have rotated through the number of revolutions corresponding to that amount of travel necessary to raise the skips to the appropriate level. Due to the fact that in most hoists there is a rather considerable amount of rope stretch, the switches 145 and 147 and switches 153 and 154 will not necessarily be actuated at the same time.

Also included in the main line to the relay 131 is a switch 155 which is controlled by the pilot lever 33 in the operator control system. As will be seen in Figure 14, the pilot lever 33 is arranged to be moved in a forward and backward direction and also in a lateral direction. Moving the lever 33 to the right as seen in Figure 14 closes the switch 155 and thus completes the circuit through the main line to the directional relay 131. Moving the pilot lever to the left closes a switch 156 for completing the circuit to the left-hand control relay 132. A pilot lever of this general form, namely one arranged to actuate switches upon movement in a lateral direction and upon movement in a forward and reverse direction, is shown in my Patent No. 2,691,080, issued October 5, 1954.

A parallel line bypasses the switches 153 and 155 and is adapted to energize the relay 131 upon actuation of a push button 157, which is provided in the operator control panel shown in Figure 14. The same push button used for closing the switch 157 may be used for closing a switch 158 in a line bypassing the switches 156 and 154 for the relay 132. The switches 157 and 158 are for the purpose of automatic operation of the hoist and they act independently of the pilot lever control switches 155 and 156. A switch 148b is provided in the bypass circuit leading to the relay 131 and a switch 146b is provided in the bypass circuit leading to the relay 132. The switch 148b is open when the left-hand relay 148 is de-energized and the switch 146b is open when the right-hand relay is de-energized.

A limit switch 159 is provided in the parallel circuit leading to the relay 131. It is adapted to be opened whenever the left-hand cage is at its bottom limit of travel. The switch 159 is adapted to be opened by the arm 152, thus cutting out the parallel circuit to the relay 131 whenever the left-hand cage reaches its lower limit of movement. A similar switch 160 is provided in the parallel circuit leading to the relay 132. It is opened by the arm 151 whenever the right-hand skip reaches its lower limit of travel.

A switch 131b is provided in the parallel circuit between the switch 159 and relay 131. It is a holding switch and it closes whenever the relay 131 is momentarily energized. A similar holding switch 132b is provided between the switch 160 and the relay 132.

The parallel line leading to the relays 131 and 132 is provided with a switch 161, which is adapted to be opened whenever the control lever 41 is in the off or neutral position. At all other positions of the control lever, the switch 161 is closed. 162 and 163 designate switches in the parallel line to the relays 131 and 132. Switch 162 opens when brake lever 52 moves to the "brake on" position. Switch 163 opens when brake lever 53 moves to the "brake on" position. Switches 164 and 165 are adapted to be closed by movement of the brake selector lever 35. When the handle of the lever 35 is moved to the right, thereby putting the right-hand brake in condition for automatic operation, switch 165 is closed and switch 164 is open. Conversely, when the selector lever 35 is moved to the left, the switch 164 is closed and switch 165 is open.

166 is a switch which is adapted to be closed when the right-hand clutch is out of engagement and 167 is a switch which is adapted to be closed when the left-hand clutch is out of engagement. 166a is a switch bypassing the switch 153 and adapted to be closed when the right-hand clutch is out of engagement. 167a is a switch bypassing the switch 154 whenever the left-hand clutch is out of engagement with the hoist drive. The switch 166 may be actuated by a lever 169 mounted in the operator control stand or panel. As shown diagrammatically in Figure 14, such a lever 169 is mounted for pivotal movement and movement to the right as shown in Figure 14, in order to disengage the right-hand clutch and close the switches 166 and 166a. A similar lever 170 is provided for the left-hand clutch. Movement of the lever 170 to the left disengages the left-hand clutch and closes the switches 167 and 167a.

From the foregoing, it will be seen that the operator of the system can condition the hoist for either raising the left-hand cage or the right-hand cage and may do so either by means of the pilot control lever 33 or by means of the automatic switches 157 and 158 which bypass the pilot lever control switches 155 and 156. Actuating the switch 157 energizes the relay 131 for the right-hand drum raising operation, whereas energizing the switch 158 energizes the relay 132 for the left-hand drum raising operation. If the operator desires manual control rather than automatic control, he establishes direction of movement of the hoist by moving the pilot control lever 33 laterally to one side or the other to close either the switch 155 or the switch 156. In either form of control, momentary energization of the relays 131 and 132 closes their associated hold-in switches 131b and 132b respectively, and maintains the energization of the relays 131 and 132.

In the control lever circuit, the turn-on control relay 133 is used only for automatic operation of the hoist. The relay 133 is supplied with current from a main line across the lines 142 and 143. The main line includes a switch 175 which is normally closed but is opened whenever it is desired to use the hoist for speeds less than the full speed. The switch 175 may be actuated by a suitable lever in the control panel, shown in Figure 14. A switch 176 bypasses the switch 175 and is adapted to be closed whenever the control lever moves through a predetermined range of its movement. This is illustrated in Figure 17. A full speed switch 177 is adapted to be closed whenever the hoist is operating at full speed and a hold-in switch 178 is provided between the switches 175, 176, 177 and the relay 133. Whenever the relay 133 is energized, the switch 178 is closed. The relay 133 may also be energized through a line 179, which includes a switch 180, closed when the relay 131 is energized, and a switch 181, which is an acceleration switch, which is closed for a predetermined period of time after the right-hand cage has started its upward movement. The line 179 connects in with a line 182 leading to the line 143. The line 182 includes a switch 183 which is normally closed but is opened whenever the slow speed relay 134 is energized. It also includes a switch 184 which is closed for automatic operation of the hoist. The switch 184 may be closed by a lever or similar actuating means provided in the pilot control stand. A line 185 bypasses the line 179 and includes a switch 186 which allows acceleration of the hoist whenever the left-hand cage is starting its upward movement. The line 185 also includes a switch 187 which is closed whenever the relay 132 is energized. The acceleration switches 181 and 186 may be associated with the geared limit switches, shown in Figure 15, so that they are actuated or closed whenever one cage or the other moves away from the upper limit, thus current may be supplied to the relay 133 either through the line 179, 185 or 175a.

The turn-on control solenoid 49 which, when energized, moves the control lever 41 in the power or "turn on" direction, is supplied with current through parallel lines 188 and 189. The line 189 includes a switch 161a which is closed whenever the pilot lever 33 is in the neutral position. It also includes a switch 133a which is closed whenever the relay 133 is energized. The line 188 includes a switch 134b which is closed whenever the slow speed relay 134 is de-energized, and a switch 135a, which is closed when the relay 135 is energized. It also includes a switch 190 which is closed whenever the pilot lever 33 is moved in the forward direction, and a switch 191 which may be closed at the will of the operator by means of any suitable actuating means, such as a lever, or the like, located in the operator control stand. A second switch 192 bypasses the switch 191 and is adapted to be opened whenever the control lever reaches a predetermined position prior to the full speed position. This position may correspond to any speed at which it is desired to transport men rather than ore. The switch 191 is closed only when there are no restrictions on the speed of the hoist. The line 188 also includes a switch 193 which may be actuated by the control lever 41. It may, for example, be open whenever the control lever reaches the full speed position, and thus break connection through the line 188.

The slow speed relay 134 is adapted to be selectively energized through lines 194, 195a, and 196. The line 194 includes a hold-in switch 134c which is closed whenever the relay 134 is energized. It also includes a switch 195 which is opened by the right-hand drum geared limit switch as the arm 151 moves away from the top limit position toward the bottom limit position. It also includes a switch 196' which is closed whenever the arm 152 of the left-hand geared limit switch moves away from the upper limit position. The line 195a includes a switch 132c which is in parallel with the switch 196' and which is closed whenever the relay 132 is energized and a switch 131c which is closed whenever the relay 131 is energized. A right-hand slow-speed switch 197 and a left-hand slow-speed switch 198 are provided between the line 143 and the switches 196' and 132c respectively. The switch 197 is closed by the arm 151 for a predetermined length of movement of the arm both toward and away from the top limit position. The same is true of the switch 198. A switch 199 may be provided in parallel with the switches 197 and 198 and is maintained normally in a closed position so as to supply current through the switches 196' and 132c independently of the switches 197 and 198. It is arranged so that it opens when pressure is in the governor.

The line 195a includes a switch 200 which is closed whenever the control lever moves to a predetermined position corresponding to what can be assumed to be a landing speed. This switch may be positioned so that it is actuated by the control lever corresponding to the landing speed position.

The line 196 includes a switch 201 which is closed whenever the control lever is at a predetermined position between the landing speed position and the off-position. A switch 202 is provided in the line 196 and may be actuated with any suitable means at the pilot or operator control stand. It is closed for slow speed operation of the hoist. The switch 202 may be a double pole switch and closes a line 203 which bypasses the switches 195, 131c, 196', 132c, 197, 198 and 199.

The turn-off control relay 135 may be selectively energized through lines 204, 205, and 206. These lines may be in parallel with one another. Line 206 may be completed by a switch 207 which is closed whenever the control lever 41 is in the off position. The line 205 may be completed by a switch 208 which is closed whenever the control lever is at the landing speed position. The line 204 is completed by a switch 135b, which is closed whenever the relay 135 is energized, a switch 209 which is opened by the arm 151 a predetermined distance prior to the arm 151 reaching the lower limit of travel, a switch 210 which is opened at a predetermined distance before the left-hand drum switch arm 152 reaches the top limit position, a switch 211 which is opened at a predetermined distance ahead of the arm 152 reaching the bottom limit of travel and a switch 212 which is opened at a predetermined distance prior to the arm 151 reaching the upper limit of travel. The switch 210 is bypassed by a switch 131d which is closed whenever the relay 131 is energized. The switch 212 is bypassed by a switch 132d which is closed whenever the relay 132 is energized.

The turn-off control relay 135 is effective when it is de-energized. It is effective to close its associated switches whenever it is de-energized. It is dependent for energization upon the landing speed switch or the control lever off position switch 212a.

The turn-off control solenoid 48 for the control lever 41 is energized through a switch 135c which is normally closed but opened by the energization of the relay 135. It also includes a switch 212a which is opened whenever the pilot lever 33 is moved rearwardly or downwardly, as shown in Figure 14. This is movement of the pilot lever 33 in the off direction.

The automatic start switch 157 may be positioned in the operator's control panel as shown or, under certain circumstances, it may be located at a remote position. In the case of mine hoists, for example, the operator's control panel or stand may be located at the upper level of the hoist and the automatic start switch may be located at the lower level. In operating the hoist automatically, the pilot lever 33 is moved forwardly or in the turn-on direction, so as to move the control lever 41 away from the off-position. This sets up the hoist for automatic operation by the switch 157. The switch 157 is effective only when one cage is at the lower level and the other is at the upper level. It should be noted that when one cage or skip, for example the left-hand skip, is at the upper level, the circuit to the directional relay 132 is broken and the circuit to the right-hand hoisting relay 131 is prepared. It is completed either by the switch 155 or the automatic switch 157.

The converse is true when the right-hand skip is at its upper limit of movement.

With the pilot control lever 33 moved forwardly in the turn-on direction and with the automatic start switch 157 closed, the hoist will be moved at a speed governed by its relative position in the hoisting shaft by reason of the acceleration, deceleration, and slow-speed switches which are operated by the gear limit switch. With the pilot control lever 33 in the turn-on direction, the control lever 41 will be moved in the turn-on direction. When the hoist is traveling through that distance between the top and bottom deceleration points, the hoist may be operating at either full speed or at man speed.

The brake lever controlling solenoid valves 56 and 57 for the right-hand brake lever 52 and the solenoid valves 58 and 59 for the left-hand brake lever are effective only when their associated brake lever 52 or 53, as the case may be, is set up for operation by the emergency brake pilot lever 34. Each of the solenoid valves 56 and 57 has a switch 215 and 216 respectively, which are provided at the lines 218 and 217 carrying power to the solenoids. The switches 215 and 216 are open when the brake selector lever 35 is moved to the right, as shown in Figure 20. Moving the lever 35 to the right sets up the right-hand brake lever 52 for automatic operation by the cam control unit. When the lever 35 is moved to the right, switches 219 and 220, provided in the lines 221 and 222a leading to the left-hand brake controlling solenoids 58 and 59, are closed. Conversely, when the selector lever 35 is moved to the left, the switches 215 and 216 are closed and the switches 219 and 220 are open.

Switches 222, 223, 224 and 225 are provided in the lines 218, 217, 221 and 222a respectively and are adapted to open the circuit to the solenoids 56, 57, 58 and 59 when the brake levers 52 and 53 have moved to opposite limits of movement. As shown in Figures 19 and 18, for example, the switches 224 and 225 may be positioned for actuation by the lever 53 and the switches 222 and 223 may be positioned for actuation by the brake lever 52. The switches 222, 223, 224 and 225 may take any suitable form. Essentially they are actuated in accordance with the movement of their associated brake levers. Whenever these switches are opened, the flow of fluid to the hydraulic motors 54 and 55 is stopped and further movement of the motors is thereby prevented which, in turn, prevents further movement of the brake levers 52 and 53.

A switch 226 is included in the line 217, between the line 143 and switch 216. It is actuated by the emergency brake pilot lever 34. A switch 227 is included in the line 218 between the line 143 and the switch 215 and is adapted to be actuated upon movement of the emergency brake pilot lever 34 in the opposite direction. The switches 226 and 227 are normally open. One or the other is closed by movement of the brake pilot lever 34 in one direction or the other. Lines 217 and 222a, which supply current to the solenoids 57 and 59 which, in turn, actuate their associated motors 54 and 55 in a direction effective to release the brakes, are connected by a line 228. The lines 218 and 221, which carry current to the solenoids 56 and 58 which, in turn, control valves which are effective to supply fluid to the hydraulic motors in a direction effective to apply the brakes, are connected by a line 229. With this arrangement either the line 217 or the line 222a may be supplied with current through the switch 226. Similarly, either the line 218 or the line 221 may be supplied with current through the switch 227, depending upon the position of the brake selector lever 35.

My system includes a means for insuring that the emergency brake is applied or released in accordance with hoisting conditions. The line 217 is provided with a switch 230 between the line 143 and the switch 226, and the line 222a is provided with a switch 231 between the switch 220 and the line 143. These switches are normally closed. They are actuated by movement of the lever 39. As shown diagrammatically in Figure 16 for example, these switches are positioned above the link 39 at a point between the connection with the governor and connection with the link 38. Whenever the lever 39 is moved from a high speed position and the governor shaft 40 does not respond, which may be due to some failure of the automatic brake or elsewhere, the lever 39 will be moved about its point of connection with the governor as a pivot and it may thus contact a button 232, or similar actuating means, to open the switches 230 and 231. This results in deenergization of the solenoids 57 and 59. Another switch 233, normally open, may be positioned for actuation by the same movement of the lever 39, so that it will be closed on this condition and thus supply current to either the solenoid 56 or 58, in order to apply that brake which has been selected for automatic operation.

A normally open switch 234 is provided between the line 143 and the switch 231 and normally closed switches 235 and 236 are provided between the line 143 and the switches 227 and 219 respectively. These switches are actuated by a button, or equivalent actuating means, 237 positioned oppositely to the actuating member 232. These switches are a safeguard against possible improper application of the emergency brake. If, for example the control lever 41 is moved from the off position toward the full speed position and the governor fails to respond, the lever 39 will be moved down about its point of connection with the governor shaft 40 and will thus open the switches 235 and 236 and close the switch 234. Opening of the switches 235 and 236 breaks the circuit to the solenoids 56 and 58 which control the motors 54 and 55 in the brake-off direction. Closing switch 234 is effective to supply current to either the solenoid 57 or 59 and thus move the brake control lever, selected for operation as an emergency brake, in a brake releasing direction.

The brake release solenoids 136 and 137 are kept in an energized condition during normal operation of the hoist. Whenever they are deenergized, fluid is exhausted from the motors 87 and thus the brakes are applied. The solenoid 136 is supplied with current through a line 240 which includes a switch 241 which is closed whenever the brake selector lever 35 is moved to the left, which places the left-hand brake in condition for automatic operation. The line 240 also includes a switch 242 which is closed whenever the right-hand clutch is engaged. The solenoid 137 is supplied with current through a line 243 which includes a switch 244 which is closed whenever the selector lever 35 is moved to the right, as shown in Figure 19, and a switch 245 which is closed whenever the left-hand clutch is engaged. By including the switches 242 and 245 in the lines leading to the brake solenoids 136 and 137, I insure that the brake for one drum or the other is applied whenever the clutch associated with the particular drum is disengaged. In normal hoisting practice it is necessary, from time to time, to disengage one clutch so to move one drum relative to the other and thus take up slack in the hoisting ropes, etc. Whenever it is desired to do this, the unclutched drum is held securely by its associated brake.

I also include a circuit which bypasses the switches 241 and 244 for supplying current to the solenoids 136 and 137 independently of the switches 241 and 244. This circuit includes a line 246 including a switch 247 which is closed whenever the control lever 41 is not in the off position. Line 246 also includes a switch 248, which is actuated by the relay 146 and is closed whenever this relay is deenergized, and a switch 249 which is normally closed but which is open whenever the left-hand cage is at its lower limit of travel. Line 246 also includes a switch 250 which is normally closed but which is open when the relay 148 is energized and a switch 251 which is normally closed but open whenever the right-hand skip is at its lower limit of travel. Line 246 supplies current to either line 240 or 243 through lines 252 and 253 respectively. A switch 254 is included in the line 252 and is opened whenever the selector lever 35 is moved to the left. Line 253 includes a switch 255 which is opened whenever the brake selector lever 35 is moved to the right. Thus the line 246 is ineffective to deliver current to the right-hand brake releasing solenoid 136 whenever the right-hand brake is operated as an emergency brake. Under this condition of operation, the switch 241 is closed and current for the solenoid 136 is supplied through the switch 241. Similarly, the line 253 is ineffective to deliver current to the solenoid 137 whenever the left-hand brake is operated as an emergency brake. Current then is supplied through the switch 244.

A normally open switch 256 bypasses the switch 248. It is closed whenever the right-hand clutch is disengaged. A similar switch 257 bypasses the switch 250 and is closed whenever the left-hand clutch is disengaged. A switch 258 bypasses both the switches 248 and 249. The switch 258 is closed whenever the relay 132 is energized. A switch 259 bypasses the switches 250 and 251 and is closed whenever the relay 131 is energized.

The circuit, including the line 246 and switches 247 through 259 inclusive, is effective to supply current to that solenoid associated with the brake which is operated as an emergency brake.

The clutch operating solenoids 138, 139, 140 and 141 are connected with the lines 142 and 143 through a line 260, which includes a switch 261 which is normally open but closed when the control lever 41 is in the off-position, a switch 262 and switch 263 which are closed whenever both brake levers 52 and 53 are in the fully on position. Thus, before current can be supplied to any of the solenoids 138, 139, 140 and 141, the control lever must first be in the off position and each brake lever must be in the fully on position. Parallel lines 264, 265, 266 and 267 supply current from the line 260 to the solenoids 138 through 141 respectively. Each of these lines may include a switch 268, 269, 270 and 271 respectively for selectively energizing these solenoids. A switch 272 is provided in the line 265 and is closed whenever the selector lever 35 is moved to the left. A switch 273 is provided in the line 266 and is closed whenever the selector lever 35 is moved to the right. Thus the solenoid 139, which disengages the right-hand drum clutch, cannot be energized unless the right-hand brake is set for emergency operation and, similarly, the solenoid 140, which disengages the left-hand drum clutch, cannot be operated unless the left-hand brake is set for operation as an emergency brake.

The control circuit includes means for preventing overhauling of the hoist. By overhauling I mean that condition wherein the hoist cage speeds up and tends to drive the hoist drive motor as a generator. As shown in Figure 13, the solenoid 30d, which is interconnected with the lever 30, is supplied with current through parallel lines 280 and 281. The line 280 includes a switch 282 which is open when the hoist is running in a predetermined direction, say, for example, when the left-hand hoist cage is being raised. Line 280 also includes a switch 283 which is closed whenever the relay 131 is energized. The line 281 includes a switch 284 which is open whenever the hoist is moved in the opposite direction and a switch 285 which is closed whenever the relay 132 is energized. A switch 286 is provided in a line 287 which bypasses both the lines 280 and 281 for supplying current to the solenoid 30d. It is known to the art to prevent overhauling of an A. C. hoist whenever the motor is operating at full speed and the switch 286 and line 287 are shown as exemplary of a means for supplying current to the solenoid 30d whenever the hoist is operating at full speed.

Figure 9:
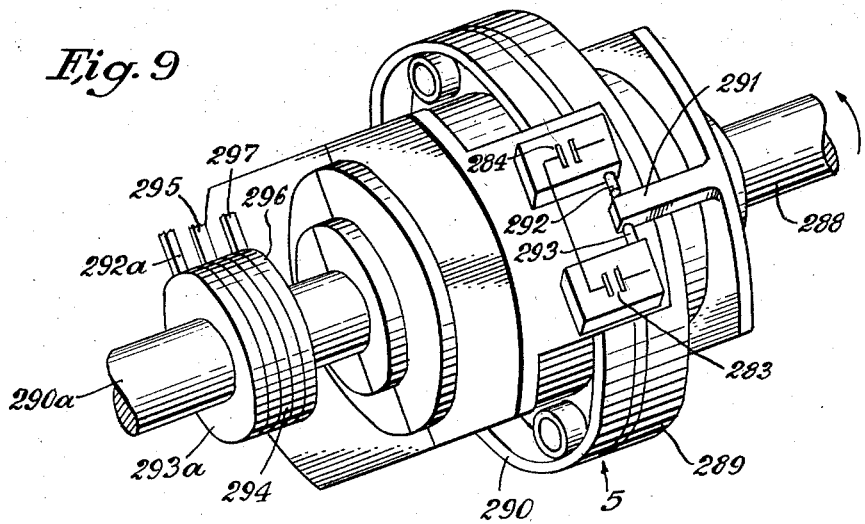
Figure 9 is a schematic showing of a torsional detecting mechanism which is illustrated in Figure 1.

The switches 282 and 284 are each adapted to be opened whenever overhauling occurs. In Figure 9 I illustrate a typical arrangement of switches to accomplish this end. In this figure the motor shaft is illustrated at 288 and the coupling, including opposed coupling elements 289 and 290, is positioned between the shaft 288 and the pinion gear 4. One side of the coupling 290 carries the switches 283 and 284 which, as shown, are in spaced relation to one another. The other side of the coupling 289 carries a switch actuating arm 291 which extends between actuating buttons 292 and 293 for the switches 284 and 283 respectively. Current for the lines 280 and 281 is supplied through a brush 292a connected with the line 143 and a ring 293a, of any suitable conductive material, and carried by the shaft leading to the pinion gear. A second ring 294 is carried by the shaft 290a and is adapted to carry current to a brush 295. A third ring 296 is carried by the shaft 290a and is adapted to carry current from the switch 284 through a brush 297 to the switch 285.

This arrangement is such that whenever the hoist drive motor 1 is driving the hoist, say for example in a direction such as to raise the left-hand hoist cage, the switch 283 will be open and the switch 284 will be closed, thus supplying current through the switch 284 and switch 285 to the solenoid 30d. If, however, the hoist should start overhauling, the hoist drum will be tending to pull the motor shaft, thus imposing a reverse torque on the coupling 5. This results in a small degree of relative movement of the two sides 289 and 290 of the coupling and this movement is sufficient to open the switch 284, thus breaking the supply of current to the solenoid 30d. It should be noted that this movement may also result in closing the switch 282 but since the switch 283 is open, no current can flow to the solenoid 30d. The same form of operation is true whenever the hoist is operating in the opposite direction. When the solenoid 30d is deenergized, its plunger retracts and it shifts the link 30b about the pivot 30c, which raises the valve plunger 36 in an amount sufficient to put the cam controlling unit into the braking range. Thus the brakes of the hoist are applied automatically in response to torque conditions in the hoist drive.

Whereas I illustrate my hoist system as applied to a double drum hoist driven by an alternating current motor, I wish it to be understood that certain principles utilized in my invention may be used with other forms of hoists. For example, in a single drum hoist or a Koepe wheel hoist, the clutch operating solenoids and the various interlock switches associated therewith would be eliminated and only a single geared limit switch would be provided. Such a limit switch may take the form of a rotatable switch acuating arm as shown in Figure 15, with a slow-speed switch, deceleration switch, etc. provided at each extremity of travel of the switch actuating arm. With a single drum hoist or a Koepe wheel type of hoist, two brakes may be employed in the general manner which I have illustrated in the drawings, i. e. where one is operated automatically by the control lever 41 and the other is operated as an emergency brake.

In situations where only a single brake is desired, the brake selector lever 35, motors 54, 55, and associated mechanisms will be eliminated with the single brake operated directly from the brake control cam 21. In such a situation, it should be understood that the various switches operated by the lever 35 and the switches operative to control the motors 54 and 55 will be deleted from the control circuit also. It is highly advantageous, however, to use the dual brake system described.

Certain features of the system may be employed with a direct current drive motor for the hoists. In that event, the overhauling preventing portion of the control circuit may be omitted and the solenoid 30d may be connected directly across the power line of the control circuit, so that the solenoid 30d is effective to apply the brakes to the hoist in the event of power failure.

Considering the typical sequence of timing events in my hoisting system, the operation of the hoist is as follows:

The operator moves the brake selector lever 35 to the right or left, thereby conditioning one brake for operation as the emergency brake and the other brake for operation in response to movement of the control lever 41 and brake cam 21. The operator then makes sure that both the left hand and the right hand clutches are engaged, as by movement of the clutch control levers 169 and 170 inwardly, or toward one another, as shown in Figure 14. Assuming that the operator desires to transport ore, the switches 175 and 191 in the control panel are closed and assuming that the operator desires full manual control of the hoist, he opens the switch 184.

The operator then moves the pilot control lever 33 in a forward direction and to the right or left, depending upon the direction of movement desired. Movement to the right, as shown in Figure 14, raises the right-hand drum while lowering the left-hand drum. The converse applies upon movement of the pilot control lever 33 to the left. This lateral movement of the pilot control lever is effective to establish one or the other of the directional control circuits and forward movement of the lever 33 is effective to rotate the vane of the motor 45 and cam 44 in a direction which "turns on" the control lever 41. This movement of the control lever 41 is effective to rotate the vane of the motor 24 and cams 21 and 22 into a position corresponding to the speed indicated by the position of the control lever 41. During this movement, the automatically operated brake is released (by movement of the plunger 87 away from pivot 93), the brake operated as the emergency brake having been released by the movement of the pilot lever 34, selector lever 35 being previously set to establish the circuit which moves the brake lever 52 or 53, depending upon which one is operating as the emergency brake.

The hoist will run at the speed selected by the positioning of the control lever. If desired, suitable dials may be provided in the panel and associated with the control lever so that the operator can see the position of the control lever 41 and thereby ascertain what speed the control lever 41 is demanding. The hoist will continue at the speed selected by the operator. If the hoist runs above or below that speed, the corresponding movement of the governor shaft 40 is effective to move the valve plunger 36 away from the "balanced" position, and rotate the cams 21, 22, and 23 in the speed increasing or speed decreasing direction, depending upon whether the hoist is below or above, respectively, the speed selected by the control lever 41. When the hoist cage or skip is at a predetermined distance away from its limit of movement, as for example at the next landing, the deceleration switch 210 or 212, as the case may be, is actuated. This results in rotation of the vane of the motor 45 in the turn-off direction and this movement of the control lever will continue until the slow-speed or landing switch 208 is contacted. This has the result of preventing further movement of the control lever 41 in the turn-off direction. At this time, however, the operator may decrease the speed of the hoist still further by further movement of the control lever 41 in the turn-off direction by pulling rearwardly on the pilot control lever 33. The operator cannot at this time, however, increase the speed of the hoist, because the slow-speed relay will have broken the circuit leading to the solenoid which actuates the motor 45 in the turn-on direction. During this final movement of the hoist, the brakes will be applied if the hoist is actually running at a speed higher than that demanded by the control lever 41, since the governor will move the valve plunger 36 in a direction such as to cause rotation of the brake cam 21 in the braking direction. When the hoist reaches its final limit of movement, the limit switches, both the geared limit switches and the shaft limit switches, are opened so as to break the circuit to the particular directional relay energized during the hoisting excursion. When the directional relay is de-energized, either the solenoid 136 or 137 is de-energized, depending upon which brake is operated automatically. This releases fluid from the fluid motor 88 and allows the valve plunger 94 to move upwardly, thereby exhausting fluid from the brake cylinder 16 or 17 and fully applying the brakes.

In the event that the operator desires automatic operation of the hoist, he first moves the pilot control lever 33 in a forward direction so as to move the control lever 41 into the landing speed position, where the switch 200 is contacted. He then closes the automatic start switches 157 and 158 and either the directional relay 131 or 132 will be energized, depending upon the position of the hoist skips at this time. It should be noted that the automatic start switch 157 can complete the circuit to the relay 131 or 132 only when the hoist is at one limit of movement. As the right-hand skip or cage is at its upper limit of movement, the limit switches in the directional control circuit leading to the relay 132 will be closed. When the right-hand skip or cage is at its lower limit of movement and the left-hand skip or cage is at its upper limit of movement, the limit switches in the circuit leading to the right-hand relay 131 will be closed. In other words, direction of movement of the hoist is determined from the particular position of the hoist skips.

When the automatic start switch is closed, the hoist will commence its movement and will move at a comparatively slow speed or at that speed indicated by the landing speed switch 200. When the hoist has moved a predetermined distance away from the starting position, the switch actuating arm 151 or 152, as the case may be, will operate the acceleration switches 195 or 196 and 186 or 181, depending upon the direction of movement of the hoist. Operating the acceleration switches opens switch 195 or 196 and closes switch 186 or 181 and has the effect of energizing the turn-on solenoid 49 which then admits fluid through its valve to the motor 45 so as to rotate the vane of the motor and thereby the control lever 41 into the full speed position. When the control lever 41 is moved to the full speed position, the switches 193 and 177 are opened, and prevents further movement of the vane of the motor 45, and the control lever is held in the full speed position.

During automatic operation, the hoist will again move at the speed selected by the position of the control lever 41 and this speed will continue until one or the other of the deceleration switches 210 or 212 is opened, which de-energizes the turn-off solenoid 49 and admits fluid to the motor 45 so as to move the vane of the motor 45 and thereby the control lever 41 in the "turn-off" direction. As in the case with manual operation, this movement will continue until the control lever 41 is at the landing speed position wherein the switch 208 is actuated. This slow speed of the hoist will continue until the limit switches are actuated so as to break the circuit for the particular directional relay then energized.

During automatic operation in the final slow speed of the hoist, the operator, if he desires, may vary the speed of the hoist by appropriate forward or reverse movement of the pilot control lever 33. Regardless of the movement of the pilot control lever 33 at this time, however, the speed of the hoist is limited to speeds below the landing speed or the slow speed position of the control lever.

If the actual speed of the hoist is above that speed selected by the control lever 41, the valve 25 is actuated so as to rotate the brake and power cam in the "turn-off" direction. If the speed of the hoist is below that dictated by the control lever, the governor shaft 40 actuates the valve 25 so as rotate the brake and power cams in the "turn-on" direction. In every instance where the governor shaft 40 moves the valve plunger in either the "turn-off" or the "turn-on" direction the link 31 anticipates the resultant movement of the governor shaft 40 after a speed change has been effected.

If, for example, the governor shaft 40 moves upwardly to a position illustrating the actual speed of the hoist as being greater than the desired speed dictated by the control lever 41, the valve plunger 36 will be moved upwardly so as to thereby rotate the cams in the "turn-off" direction. Movement of the cams in response to this movement of the governor shaft 40 results in a downward movement of the link 31 which moves the valve plunger 36 back toward the neutral or balanced position. As the governor shaft recedes in response to a decrease in the actual speed of the hoist, the valve plunger 36 will be moved still further until it reaches a balanced or neutral position where the cams 21, 22, and 23 are held in a static position. The converse anticipatory action of the link 31 in regulating the valve 25 is true when the displaceable shaft 40 of the governor indicates an actual speed below the desired speed set by the position of the control lever 41. The regulation of the valve 25 by the link 31 materially restricts "hunting" or over-travel or under-travel of the governor shaft 40.

There are several safety features inherent in the system. For example, the operator of the hoist has the one brake available for actuation by the emergency brake lever 34 independently of the control linkage and cam unit operation. In the event that the hydraulic system pump motors are stopped for any reason, such as, for example, in case of a power failure, the hydraulic pressure built up in the accumulator is sufficient to drive the generator associated therewith over a time period sufficient to bring the hoist to a safe stop.

In the event of total power failure in the control circuit, the solenoid 30d is de-energized which results in an immediate rotation of the controlling cams in the brake applying direction. Furthermore, the brake release solenoids 136 and 137 will be de-energized thereby allowing release of hydraulic pressure in both brake cylinders 16 and 17.

An advantageous feature of the system resides in the speed of the hoist being proportional to the position of the control lever 41. If desired, switches, such as the man-speed switch, as I have indicated at 176 and 192 in the drawings may be positioned for actuation by the control lever 41 at a particular point in the range of movement of the control lever to this position and limit the speed of the hoist to a speed proportional to this position.

I wish it to be understood that the switches and actuating mechanisms therefor which are illustrated in Figures 14, 15, 16, 17, 18, 19 and 20 should be taken in a diagrammatic manner. The particular form of switch employed and the particular actuating mechanism for the switch in each instance is relatively unimportant. The important thing is that these switches be actuated in the time sequence with relation to the movement of the hoist and the movement of the control lever 41, and brake levers 52 and 53 which I have illustrated in these figures. The showing of the switches and actuating mechanisms in these figures should not be taken in a limiting sense but should be taken as illustrating the functional relation between the switches shown and the movement of the hoist.

Whereas I have shown and described an operative form of my invention, I wish it to be understood that this should be taken in an illustrative or diagrammatic sense only and that there are many modifications in the invention which will fall within the scope and spirit of the invention and which will be apparent to those skilled in the art. The scope of the invention should therefore be limited only by the scope of the hereinafter appended claims.

I claim:

1. In combination, a hoist drum and a motor for rotating said hoist drum in opposite directions at varying speeds, said motor having a power control means and a braking means therefor, said power control means including a movable control member having a range of movement corresponding to predetermined speeds of said motor and said hoist drum, initial movement of said movable control member away from a neutral position being effective to apply progressively decreasing braking effects on said drum through said braking means, and further movement being effective to apply progressively increasing power to said motor, a fluid motor for moving said movable control member through said range and a pilot control valve for said fluid motor, a movable control linkage for moving and thereby regulating said valve and thereby said fluid motor and said hoist drum, means responsive to the speed of said first named motor for regulating said linkage, means responsive to the position and movement of said movable control member for regulating said linkage, operator controlled means for moving said linkage, movement of said operator controlled means in a speed increasing direction in adjusting said linkage being opposed by the action of said motor speed responsive means and means responsive to the position of said movable control member in regulating said linkage.

2. The structure of claim 1 characterized by and including a fluid motor control valve in the form of a balance valve having a plunger interconnected with said linkage.

3. In a hoisting system, a hoist and a motor for driving said hoist in a predetermined direction, a control means for said hoist including a brake and power control means for said motor, and said power control means being effective to drive said motor and thereby said hoist in a predetermined direction, and means responsive to overhauling of said hoist and motor for applying the brakes to said hoist.

4. In a hoisting system, a hoist and a motor for driving said hoist in a predetermined direction, control means for said hoist including a brake and power control means for said motor, said power control means being effective to drive said motor and thereby said hoist in a predetermined direction, and means responsive to overhauling of said hoist and means responsive to an increase in speed of said hoist beyond that set by said control means for applying said brakes to said hoist.

5. In a hoisting system, a hoist and a motor for driving said hoist in predetermined directions, a movable control linkage associated with the motor so that through movement thereof variant braking pressures will be applied to said hoist and variant power to said motor, means responsive to overhauling of said hoist for adjusting said linkage, and means responsive to adjustment of said linkage for applying braking pressure to said hoist.

6. The structure of claim 5 wherein said control linkage includes a control lever having a range of movement away from a neutral position proportional to different speeds of said hoist and said linkage adjustment is operative independently of the position of said control lever.

7. The structure of claim 5 wherein said responsive means includes a solenoid having a plunger effective upon deenergization of said solenoid to adjust said linkage, and said solenoid is de-energized in response to overhauling of said hoist.

8. The structure of claim 5 wherein said responsive means includes a normally energized solenoid effective upon de-energization thereof to adjust said linkage and a control circuit for said solenoid effective to maintain said solenoid in an energized position irrespective of the direction of movement of said hoist, and means for breaking said circuit in response to overhauling of said hoist.

9. The structure of claim 8 wherein said circuit breaking means includes switches for a coupling between said motor and said hoist, normal movement of said hoist in response to rotation of said motor being effective to maintain a selected switch in closed position.

10. The structure of claim 5 wherein a solenoid is provided for adjusting said linkage.

11. The structure of claim 5 wherein said control linkage is effective, through movement thereof, to actuate a controlling valve for a brake cam and a power cam.

12. The structure of claim 5 characterized by and including rotatable cams to actuate the brakes and vary the power supplied to said motor, and a controlling valve for a motor adapted to rotate said cams and hold them in a selected position, said linkage being interconnected with an actuating member for said valve and being effective through adjustment thereof in response to overhauling of said hoist to rotate said cams to a brake applying position.

13. A hoist system including a hoist and a movable power control lever to control the application of brakes and power input for the hoist, automatic means for diminishing the power input to the hoist prior to the end of the hoisting, said control lever, through movement thereof, being effective to apply the brakes to the hoist independently of said automatic means.

14. In a hoisting system, a hoist and motor means for traversing said hoist between limits of travel, a movable, operator actuated control lever interconnected with a brake applying mechanism for the hoist and a speed control mechanism for said motor, means constructed to apply and release the brakes to the hoist and to vary the power input to said motor upon movement of the control lever, means for decelerating said hoist for a predetermined period of time near the end of the movement of said hoist in one direction, and means for rendering said control lever ineffective to increase the speed of said motor during said deceleration period of said hoist.

15. In a hoist system, a hoist drum and a drive motor for said hoist drum, a directional control circuit for each direction of movement of said motor and drum, an operator actuated pilot lever movable in opposite directions to complete a selected directional control circuit, and switch means for completing a selected circuit independently of said pilot control lever.

16. In a hoist system, a hoist drum and a drive motor for said hoist drum, a directional control circuit for each direction of movement of said motor and drum, an operator actuated pilot lever movable in opposite directions to complete a selected directional control circuit, and switch means for completing a selected circuit independently of said pilot control lever, said circuits including limit switches effective to open one of said circuits and close the other circuit when the hoist drum is at a limit of movement, said switch means being effective to close the circuit closed by said limit switch.

17. In a hoist system, a hoist drum and a drive motor for said hoist drum, a directional control circuit for each direction of movement of said motor and drum, a control lever movable to vary the power input to said motor and thereby vary the speed of said motor and drum, switch means actuable in response to movement of said control lever to a neutral position for opening said directional control circuits, operator controlled means for closing a selected directional control circuit while maintaining the other open, when said control lever is away from said neutral position, and an operator actuated, automatic operation switch effective to close a selected directional circuit independently of said operator controlled means when said first-named switch is closed.

18. A hoist system as set forth in claim 17 wherein said automatic operation switch means is effective only when the hoist is at a predetermined limit of movement.

19. In a hoist system a hoist drum and a drive motor for said hoist drum, a control lever effective upon movement away from a neutral position to apply increasing power to said motor and thereby increase the speed of said drum, a motor for moving said control lever toward and away from said neutral position, operator actuated means for controlling the movement of said motor and means for energizing said motor and thereby moving said control lever in a direction toward said neutral position in response to movement of said drum into a position a predetermined distance away from the limit of movement of said drum.

20. A hoist system as set forth in claim 19 wherein said last-named means is effective independently of said operator actuated means.

21. In a hoist system as set forth in claim 19 characterized by and including means for limiting the movement of said control lever to a predetermined slow speed position independent of said operator controlled means.

22. A hoist system as set forth in claim 21 wherein said operator controlled means is effective to move said control lever through a range corresponding to varying speeds below the slow speed position.

23. In a hoist control system, a hoist drum and a drive motor for said hoist drum, an hydraulic circuit including an accumulator for said hydraulic brake mechanism, power control means for said drive motor, a controlling circuit for said power control means and brake mechanism, and an hydraulic driven generator for said control circuit, said generator being driven by the pressure in said accumulator.

24. In a hoist control system, a hoist drum and a drive motor for said hoist drum, a brake mechanism for said hoist drum, a control lever movable to control said brake mechanism and said drive motor, remote control means for moving said lever in opposite directions to thereby vary the speed of said hoist drum, and automatic means for moving said control lever in a speed decreasing direction as the hoist drum approaches a limit of movement.

25. In a hoist control system, a hoist drum and a drive motor for said hoist drum, a brake mechanism for said hoist drum, a control lever movable to control said braking mechanism and said drive motor, remote control means for moving said lever in opposite directions to thereby vary the speed of said hoist drum, and automatic means effective to move said control lever in a speed increasing direction a predetermined period of time after the hoist starts its movement away from a stopped position.

References Cited in the file of this patent

UNITED STATES PATENTS

| | | |
|---|---|---|
| 2,456,908 | Bollaert | Dec. 21, 1948 |
| 2,462,484 | Fox | Feb. 22, 1949 |
| 2,642,275 | Sollinger | June 16, 1953 |
| 2,658,589 | Ashton | Nov. 10, 1953 |
| 2,672,222 | Stevens | Mar. 16, 1954 |
| 2,692,132 | Murray et al. | Oct. 19, 1954 |